(12) United States Patent
Raspante et al.

(10) Patent No.: US 6,427,524 B1
(45) Date of Patent: Aug. 6, 2002

(54) MULTIPLE SENSOR IN-LINE CONTAINER INSPECTION APPARATUS AND METHOD

(75) Inventors: Frank Raspante, Centerville, MA (US); David V. Rose, Portsmouth, RI (US); Charles A. Woringer, N. Falmouth, MA (US); William H. Hulsman, E. Falmouth, MA (US); Donald R. Stark, Hatchville, MA (US)

(73) Assignee: Benthos, Inc., North Falmouth, MA (US)

( * ) Notice: Subject to any disclaimer, the term of this patent is extended or adjusted under 35 U.S.C. 154(b) by 0 days.

(21) Appl. No.: 09/690,276

(22) Filed: Oct. 17, 2000

Related U.S. Application Data

(60) Provisional application No. 60/160,351, filed on Oct. 19, 1999, and provisional application No. 60/215,036, filed on Jun. 29, 2000.

(51) Int. Cl.[7] .................................................. G01M 3/04
(52) U.S. Cl. .......................................... 73/45.4; 73/818
(58) Field of Search .......................... 73/40, 41, 40.5 R, 73/40.5 A, 40.7, 45.4, 818, 820, 824

(56) References Cited

U.S. PATENT DOCUMENTS

| | | | |
|---|---|---|---|
| 3,683,676 A | 8/1972 | Haas | |
| 3,751,972 A | 8/1973 | Haas | |
| 4,019,370 A | * 4/1977 | Allocoo, Jr. | 73/45.1 |
| 4,055,984 A | 11/1977 | Marx | |
| 4,061,014 A | 12/1977 | Bott et al. | |
| 4,184,362 A | * 1/1980 | Standley et al. | 73/40.7 |
| 4,774,830 A | 10/1988 | Hulsman | |
| 4,805,679 A | 2/1989 | Czinner | |
| 4,861,553 A | 8/1989 | Mawhirt et al. | |
| 4,862,732 A | 9/1989 | Raymond et al. | |
| 4,864,848 A | * 9/1989 | Irvine | 73/45.4 |
| 4,898,023 A | 2/1990 | Yamada et al. | |
| 5,105,654 A | 4/1992 | Maruyama et al. | |
| 5,239,859 A | 8/1993 | Lehmann | |
| 5,333,492 A | * 8/1994 | Aarts | 73/49.3 |
| 5,365,774 A | 11/1994 | Horlacher | |
| 5,507,177 A | 4/1996 | Focke | |
| 5,513,516 A | 5/1996 | Stauffer | |
| 5,767,392 A | 6/1998 | Belcher et al. | |
| 5,869,747 A | 2/1999 | Hulsman | |

* cited by examiner

Primary Examiner—Max Noori
(74) Attorney, Agent, or Firm—Francis J. Caufield

(57) ABSTRACT

This invention relates to apparatus and methods for in-line testing for leaks in flexible containers traveling along a production line at high speeds. The apparatus inspects semi-rigid plastic containers at a high capacity by using multiple sensors at fixed displacements along a compression section while analyzing the response of the sensors such that internal pressure decays of leaky containers are readily discernible without interrupting the flow of the production line.

37 Claims, 19 Drawing Sheets

MULTIPLE SENSOR IN-LINE CONTAINER INSPECTION APPARATUS AND METHOD

REFERENCE TO RELATED APPLICATION

This application claims priority of Provisional Application Serial No. 60/160,351, filed Oct. 19, 1999, and of Provisional Application Serial No. 60/215,036, filed Jun. 29, 2000. The entire disclosure of these Provisional Applications is herein incorporated by reference.

BACKGROUND OF THE INVENTION

This invention generally relates to apparatus and methods for testing flexible containers. More specifically, this invention relates to apparatus and methods for testing the fluid tightness and/or seal integrity of containers and especially, but not exclusively, is intended for use in testing containers comprising a container body having an aperture or opening which is sealed by a lid or cap.

In many industries, it is important to test the fluid tightness and seal integrity of containers. For example, in the food industry, it is essential to ensure that containers in which food products are packed are completely sealed to ensure that the contents are in good condition, free from molds, bacteria and other pathogenic organisms, so that they will be safe when used by consumers. The pharmaceutical industry similarly requires that containers for medications, especially solutions intended for injection or intravenous administration, be protected from contamination or serious danger to public health may result.

Because fluid tightness and seal integrity of containers is not readily ascertained by visual inspection, various attempts have been made to provide apparatus for testing for these properties (hereinafter, for convenience, called "leak detection apparatus.") For example, U.S. Pat. No. 4,862,732 describes a "squeezing apparatus" for testing the fluid tightness and/or seal integrity of plastic bottles, such as those in which laundry detergents are commonly sold. This apparatus creates a pressure within the bottle by squeezing it by means of a pneumatic cylinder. It monitors the position of the piston of this cylinder; if the bottle does not leak, the piston stops as soon as the pressure in the bottle increases enough to balance the force of the piston. After equilibrium, continued pressure caused by the squeezing diminishes as pressurized gas within the bottle leaks by being forced through a leak hole, and thus the piston of the pneumatic cylinder moves further than in the case of a non-leaking bottle.

The apparatus described in this patent gives good results under commercial conditions with the bottles for which it was designed.

U.S. Pat. No. 5,767,392 to William David Belcher, et al. issued on Jun. 16, 1998 describes a method and apparatus for leak testing a closed container by applying a compressive force to the container, releasing the compressive force, and measuring the recovery of the container a predetermined time after the compressive force is released. The recovery is correlated with the pressure or absence of leaks. The Belcher, et al. patent appears to suffer from the inability to cope with variations in container temperature and physical properties of the container and its contents.

Several forms of leak detection apparatus are known which do not rely on squeezing the container. In one form of such apparatus, the container to be tested is placed within a fluid tight chamber, the pressure within the chamber is changed from atmospheric to above or below atmospheric, and the effect of this pressure change on the container is monitored. For example, U.S. Pat. No. 3,751,972 (Hass) describes a leak detector for testing sealed containers formed of semi-rigid or flexible material. The container to be tested is placed in a chamber which is thereafter pressurized at a pressure distinctly different from the internal container pressure, whereby the container is caused to physically distort. A container dimension is first sensed before the chamber is pressurized to produce a first signal representing the dimension resulting from the difference between container internal pressure and atmospheric pressure, this first signal being held. When the container is under pressure in the chamber and a predetermined time interval has elapsed, the container dimension is again sensed to produce a second signal representing the dimension as a result of the difference between internal pressure and chamber pressure. The first held signal and the second signal are compared and if the disparity therebetween indicates a significant change in dimension, the container is accepted, whereas if there is little disparity between the signals, the container is rejected.

Similarly, U.S. Pat. No. 5,105,654 (Maruyama et al.) describes an apparatus which is generally similar to that of Hass but in which at least a portion of the container being tested comprises an electrically conductive material, and the chamber is provided with an eddy-current displacement sensor to detect the position of the conductive material of the container.

U.S. Pat. No. 5,365,774 (Horlacher) also describes an apparatus which is generally similar to that of Hass but in which the chamber is equipped with a suction cup at the end of a suction pipe. This suction cup is placed above the flexible cover of the container being tested. When the pressure in the chamber is reduced, the cover bulges and blocks the suction cup. If the seal between the cover and the body of the container is ineffective, the lid does not bulge and block the cup, thus enabling the ineffective seal to be detected.

U.S. Pat. No. 5,513,516 (Stauffer) describes a method and apparatus in which a flexible or semi-flexible package is received within a closeable test cavity, and a pressure differential is established between the inside of the container and an enclosed space within the test cavity outside of the container. The closeable test cavity comprises a flexible wall whose shape adapts to the shape of the container, at least when the pressure differential is established. The flexible wall advantageously compensates for variations in head space and shape of the packages, as when the contents are not uniformly distributed within the package. The flexible wall can sealingly contact a portion of the container spaced from a container seal to permit detection of seal leaks. A gas permeable, flexible screen can be employed between the container and the flexible wall to permit leak detection of leaks in the container beneath the flexible wall.

Similarly, U.S. Pat. No. 4,055,984 (Marx) describes a device for detecting leaks in an article having readily deformable walls. This device has conventional arrangements for performing a leak detection by overpressure or by vacuum and has a deformable backup wall for engagement with the walls of the article. The backup wall is, on its face oriented towards the article, so configured that between the backup wall and the article there is obtained a coherent fluid tight space which may be evacuated.

The leak detection devices just described suffer from one serious problem when used in commercial settings. Food packages for retail sale, and similar relatively low cost packages, are normally filled on continuous packing lines which run at high speeds, typically at least 30 packages per minute, and it is highly desirable to conduct the leak detection procedure in-line with the packing line. Removing one or two packages from such a packing line, placing them within a vacuum chamber, resealing and applying a vacuum to the chamber, effecting the desired measurement on the package(s), restoring the chamber pressure to atmospheric, opening the chamber and removing the package(s) will in total take at least several seconds. Thus, it is difficult to carry out the leak detection procedure with a throughput sufficient to keep up with the packing line. Although multiple sets of leak detection apparatus can of course be used with a single packing line, the provision of such multiple sets, together with the necessary apparatus for directing packages to the proper leak detection apparatus, and reassembling the packages into a single stream after leak detection, greatly increases the complexity and cost of the packing line.

U.S. Pat. No. 4,774,830 (Hulsman, assigned to the same assignee as the present application), describes a leak detection apparatus which operates on a rather different principle from those previously described. The Hulsman apparatus is used in detecting defective flange-shaped seals between lid and body portions of a package. A pressure chamber is provided for isolating the external edge of the seal and applying a test pressure thereto. Containment of the pressure chamber includes sealing pressure applied mechanically to the flange-shaped package seal during testing. If the seal is defective, gas flows in one direction between the pressure chamber and interior of the package, thus causing a displacement of the lid of the package, and this displacement of the lid is detected by a position detector disposed adjacent a central portion of the lid, this central portion of the lid lying outside the pressure chamber and thus being maintained at ambient pressure. The Hulsman apparatus is effective in detecting leaks and better adapted than the apparatus previously discussed for use in-line with a packing line, since the Hulsman apparatus does not require removal of each package from the line and placement of the whole container within a pressure or vacuum chamber. The pressure chamber of the Hulsman apparatus is formed by two separate members which can close, clamshell style, on a package which is already resting on a transport conveyor or similar device. However, the Hulsman apparatus does require that the seal be placed within a pressure chamber. In addition, there is some risk of mechanical damage as a fragile lid is grasped between the members forming the pressure. Also, the process will not detect a leak located anywhere except in the lid sealing area, for example, in the lid or in the cup.

Accordingly, it is a primary object of the present invention to provide high-speed apparatus and methods for leak testing containers without removing the containers from a production line.

It is another object of the present invention to provide apparatus and methods for in-line leak testing of flexible containers while automatically compensating for container to container variations in temperature and physical properties.

It is another object of the present invention to provide apparatus and method in-line testing of containers for the presence of overfilled, underfilled, and empty containers.

It is another object of the present invention to provide apparatus and methods in-line leak testing of containers which contain self diagnostic capability for detecting changes in apparatus properties such as sensor degradation or drift.

It is yet another object of the present invention to provide apparatus and methods for in-line testing of containers while generating statistical data for process control and quality assurance purposes.

It is yet another object of the present invention to provide apparatus and methods for in-line testing of containers having the ability to keep track of production line stops.

Other objects of the invention will, in part, be obvious and will, in part, appear hereinafter when the description to follow is read in conjunction with the drawings.

SUMMARY OF THE INVENTION

This invention relates to an apparatus for testing flexible containers, this apparatus comprising:

in-line means for applying a predetermined compression over a predetermined time to a plurality of containers as they travel along a production line without interrupting the flow of containers along the production line;

at least two sensors spaced apart with respect to one another at predetermined positions along the path of travel taken by the compressed containers to generate responses that vary in accordance with the internal pressure of the containers as they pass by the sensors; and means for receiving the responses and analyzing them for the presence of leaks in the containers.

This invention also relates to a method for testing flexible containers as they travel along a production line without interrupting the flow of containers along the production line, this method comprising:

applying a predetermined compression to the plurality of containers as they travel along the production line;

while the predetermined compression is applied to each container, contacting the container with each of at least two sensors spaced apart from one another to generate responses that vary in accordance with the internal pressure of the container at it passes by the sensors, any given container contacting the at least two sensors at different times; and analyzing the responses for the presence of leaks in the containers.

The apparatus and method of the present invention are useful for in-line testing for leaks in flexible containers traveling along a production line at high speeds. The apparatus can inspect semi-rigid plastic containers at a higher capacity than existing intermittent motion leak detection designs by using multiple sensors positioned at predetermined spaced locations along a compression section to sense properties of the containers as they pass by the sensing stations. The compression of the containers and the location and properties of the sensors are arranged such that the responses of the sensors vary in correspondence with the presence and absence of leaks in the containers. Analysis of the sensor responses is performed to determine which containers have leaks based on differences in responses among the sensors.

BRIEF DESCRIPTION OF THE DRAWINGS

The structure, operation, and methodology of the invention, together with other objects and advantages thereof, may best be understood by reading the detailed description in conjunction with the drawings in which each part has an assigned numeral that identifies it wherever it appears in the various drawings and wherein.

DETAILED DESCRIPTION OF THE INVENTION

Figure 1:
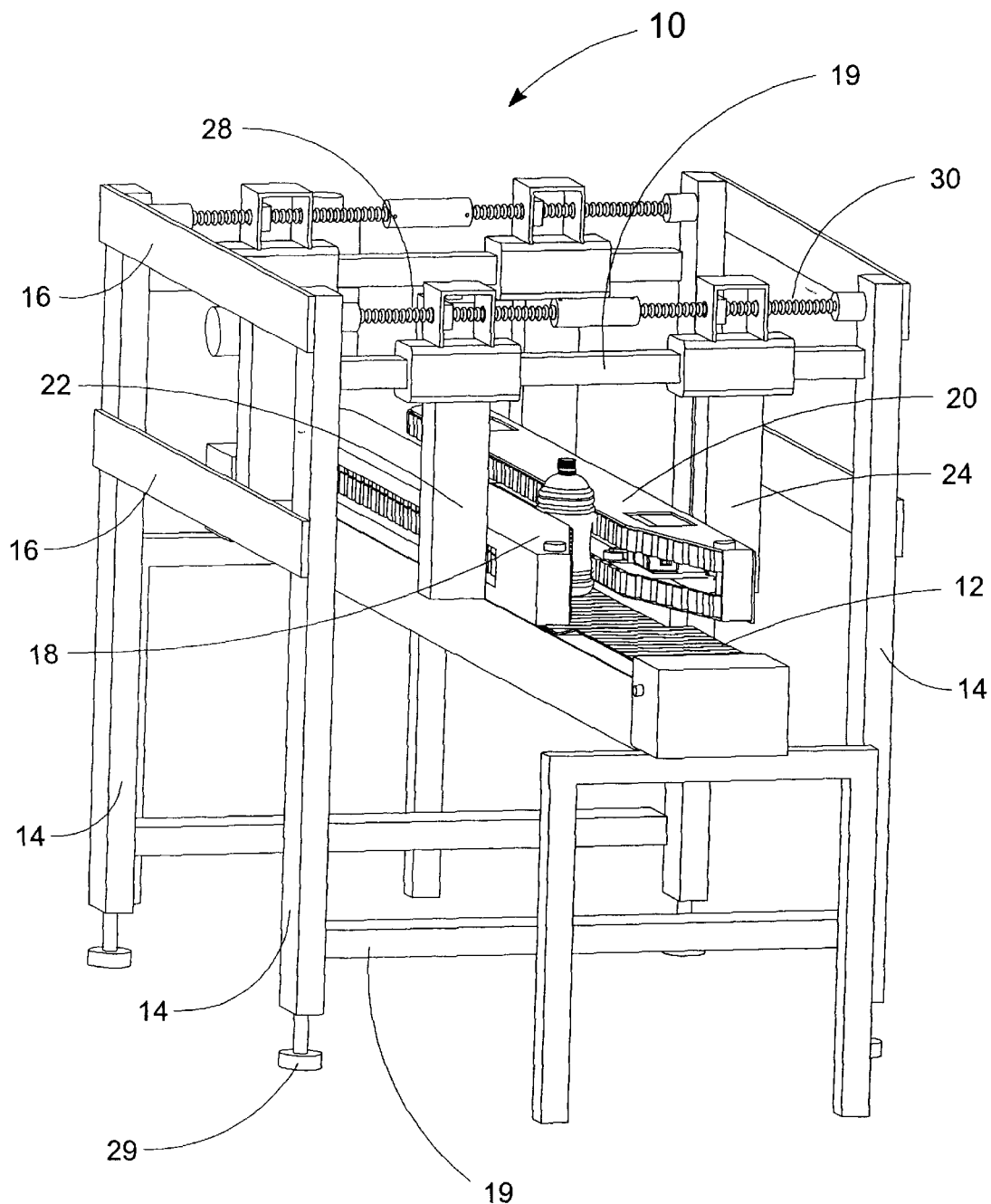
FIG. 1 is a perspective view of the apparatus of the invention positioned over a portion of a continuous conveyor for transporting containers along a production line as they undergo various manufacturing and testing operations.

The present invention generally relates to apparatus and methods for leak testing flexible containers such as those made of plastic and containing a fluid that is typically removed from the container by pouring it through an opening that is initially sealed during manufacture with a closure such as a screw on-cap. Typically, there is an air space above the fluid surface. With such containers, leaks can occur because of poor closure seals or the presence of holes in either the air space or container walls covered by fluid.

To test for such leaks, and for other defects such as over or under-filled containers, the invention relies on the use of a compression system that applies a predetermined displacement to the container as it travels along a predetermined path in-line and synchronized with the container production line so that containers need not be removed from production for testing purposes. While a container travels along the predetermined distance during which compression is applied, it is sensed at at least two test stations to provide information about the internal pressure of the container at these stations. The information generated is then passed to a computer or dedicated processor (DSP) for purposes of analysis. Afterwards, containers that are found defective are removed from the production line in any well-known manner.

In the apparatus of the present invention, the in-line means desirably comprises two substantially parallel movable members spaced apart from one another and arranged to hold the plurality of containers therebetween, and to move the plurality of containers along the production line while applying the compression to the containers. Conveniently, the apparatus is provided with adjustment means for adjusting the spacing between the movable members to allow the apparatus to operate on containers of differing sizes. Preferably, the movable members have the form of endless belts, and desirably the surfaces of the movable members which contact the containers are textured and non-planar.

Also, in the present apparatus, desirably at least one of the sensors comprises a contact member and a deformable member, the contact member being arranged to contact each of the containers as it undergoes the predetermined compression, and the deformable member has one end connected to the contact member and its opposed end connected to a fixed member, the deformable member being provided with signal generating means arranged to generate a signal representative of the deformation of the deformable member caused by contact between the contact member and each container. Conveniently, the contact member has the form of a freely rotatable roller which can roll over the surface of each container.

For reasons explained in detail below, the apparatus of the present invention may have at least two pairs of sensors arranged so that each container passes all of these two pairs of sensors, with the receiving and analyzing means being arranged to analyze the readings from each pair of sensors independently and to generate an output signal if the results of the analysis from two different pairs of sensors differ by more than a predetermined amount. This form of the apparatus desirably has at least two separate in-line means, one effecting compression of each container as it passes one pair of sensors, and another effecting compression of each container as it passes another pair of sensors.

Figure 2:
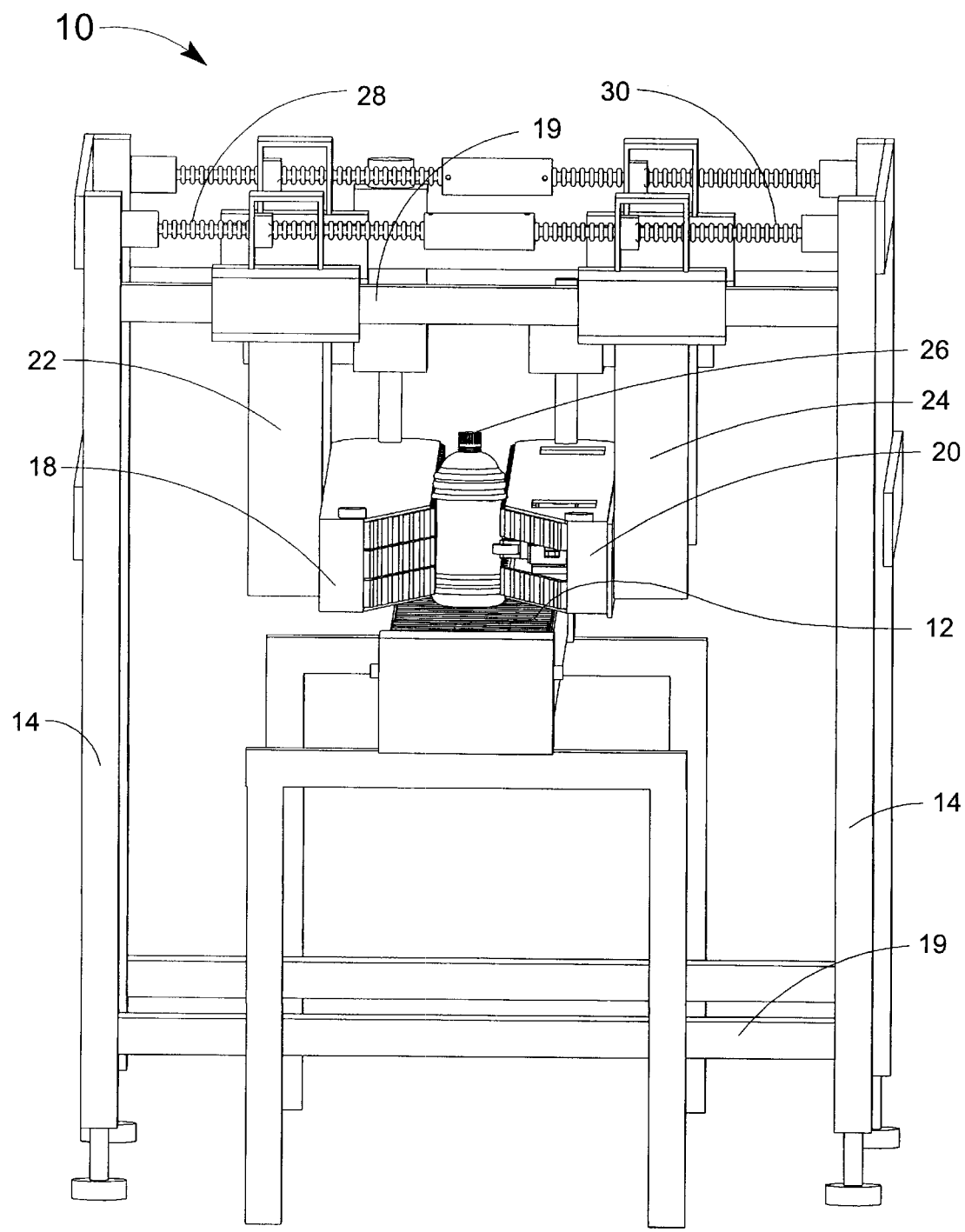
FIG. 2 is a perspective view looking down spaced apart compression belt assemblies of the apparatus of the invention as a container, in this case a sealed bottle of saline, is conveyed through a compression gap formed between the assemblies as it is transported along the production line while being tested for leaks.

Reference is now made to FIGS. 1 and 2 which show the leak testing apparatus of the invention where it is generally designated as system 10. System 10 comprises a frame that supports a pair of opposed compression assemblies 18 and 20 as will be described. Compression assemblies 18 and 20 sit just above a production line 12 that feeds containers (typically shown at 26) between them. Only a segment of a production line 12 is shown, and those skilled in the art will appreciate that such production lines will run for significantly longer lengths both prior to and after system 10 in a fully implemented production environment.

The frame that supports compression assemblies 18 and 20 is designed to permit the height and width between compression assemblies to be adjusted to fit the requirements of the production line and the size of the container which it is to test. To achieve support and adjustability, the frame comprises four vertical corner columns 14 that are connected lengthwise (in the direction of travel of the production line) by horizontally extending beams 16 and widthwise by crosswise extending beams 19.

Depending downwardly from crosswise extending beams 19 are hangers 22 and 24, two for each compression assembly 18 and 20, respectively. Hangers 22 and 24 are connected with a pair of oppositely handed screws 28 and 30, respectively, that operate to change the gap between compression assemblies 18 and 20. Because screws 28 and 30 have opposite handedness, compression assemblies 18 and 20 move toward and away from one another by equal amounts to adjust the gap between them in symmetrical fashion. In this connection, it is preferable to link the upstream screws 18 and 20 with their downstream counterparts with a chain drive so that the gap between compression assemblies 18 and 20 so that they may be adjusted in parallel, but this is not essential.

To adjust the vertical height of compression assemblies 18 and 20, each of the four corner columns is provided with an adjustable foot 29 to raise and lower the frame including compression assemblies 18 and 20.

Figure 3:
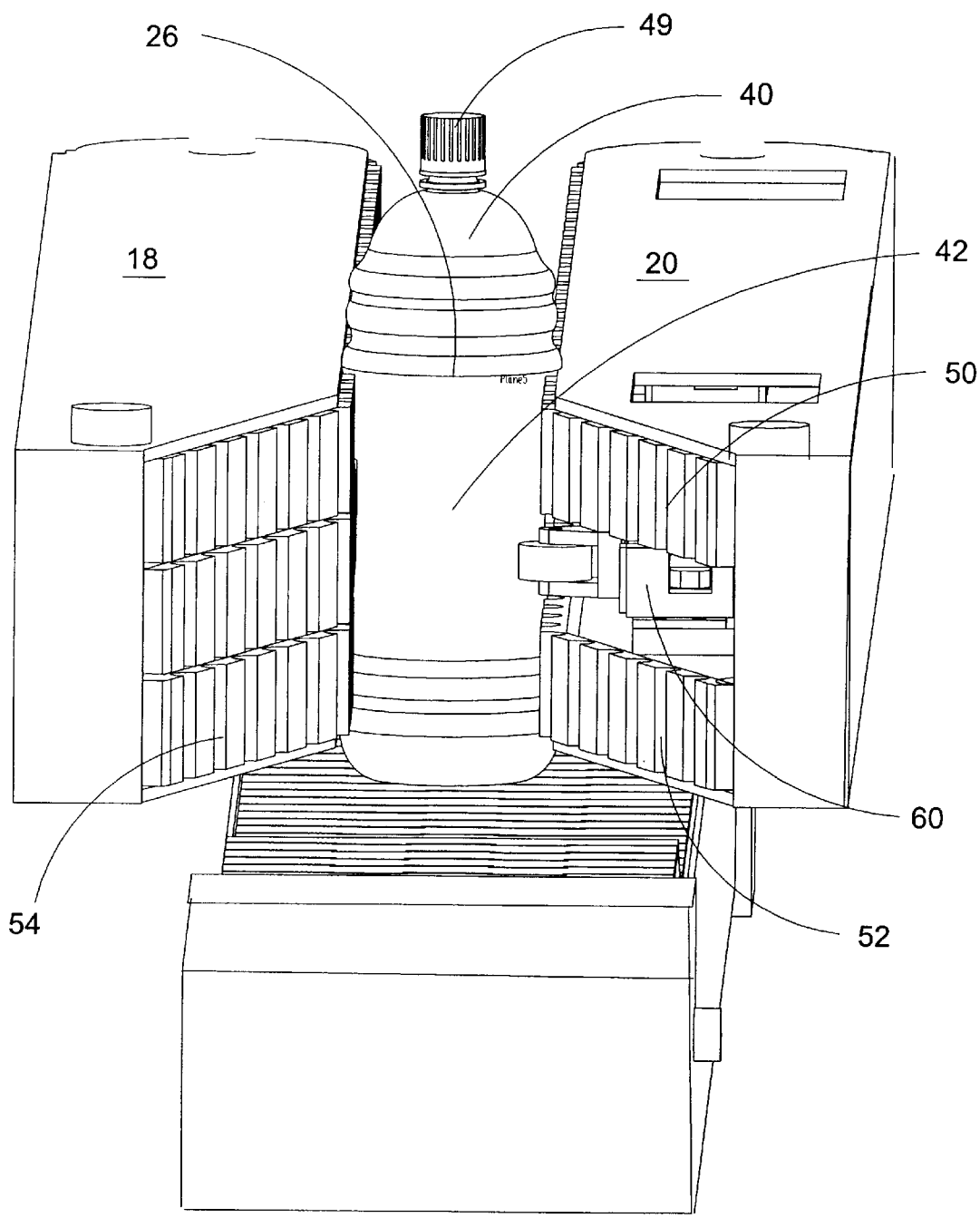
FIG. 3 is a perspective view of a compressed container just before it enters a first sensor station positioned along the compression belt assemblies of the invention.

Reference is now made to FIG. 3 which shows that compression assembly 18 comprises a compression belt in the form of three linked together belt sections 54 while compression assembly 20 comprises belt in the form of two spaced apart belt sections 50 and 52. As will be seen, the spacing between belt sections 50 and 52 permit rollers 66 (See FIGS. 8 and 11) for sensors such as that designated at 60 to contact containers 26 as the pass by test stations to generate information about the internal pressure in a compressed container 26.

Belt sections 50, 52, and 54 are formed of a chain to which flight segments are attached and the chains are driven in the usual manner by sprocket assemblies. In this way, the individual flights of the compression belt sections may be replaced for wear or breakage as needed. In addition, the surfaces of the flights can be randomly textured to permit detection of leaks that occur in the body section contacted by the flights. The random texturing in this connection is used to avoid covering a hole that would otherwise leak if contacted by a flight having a smooth surface.

FIG. 3 also illustrates that compression assemblies 18 and 20 include an initial section that is tapered to channel containers into the compression gap set between their belt sections. The compression gap set between the compression assemblies 18 and 20 is set in a manner to be described but, in general, depends on the pressure at which the closure or seal is designed to fail.

As seen in FIG. 3, a container 26 typically is made of a flexible plastic material that is filled with a fluid 42 to a predetermined fill level. Above the fill level of the fluid 42 is an air space or head space 40, and the container is sealed by a cap 49. Leaks often occur in the head space because of holes or faulty caps 49, and loss of internal container pressure from leaks in the head space 42 will occur more quickly than if a leak occurs in the fluid filled portion of the container because it is easier to force air through a leak hole than a fluid, others things being equal.

Figure 4:
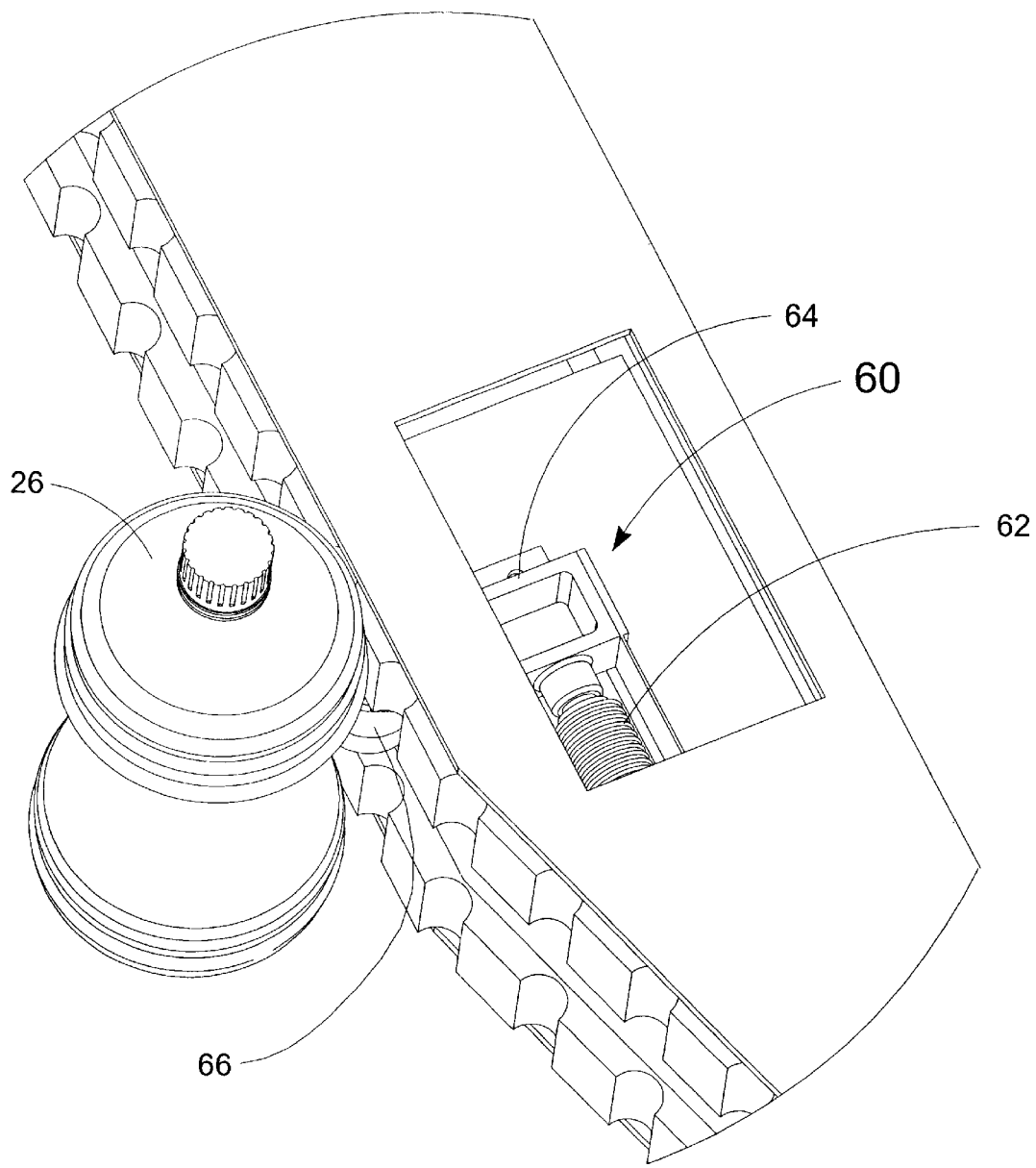
FIG. 4 is a perspective showing a typical load cell used in the invention for sensing the internal pressure of a compressed container.
Figure 8:
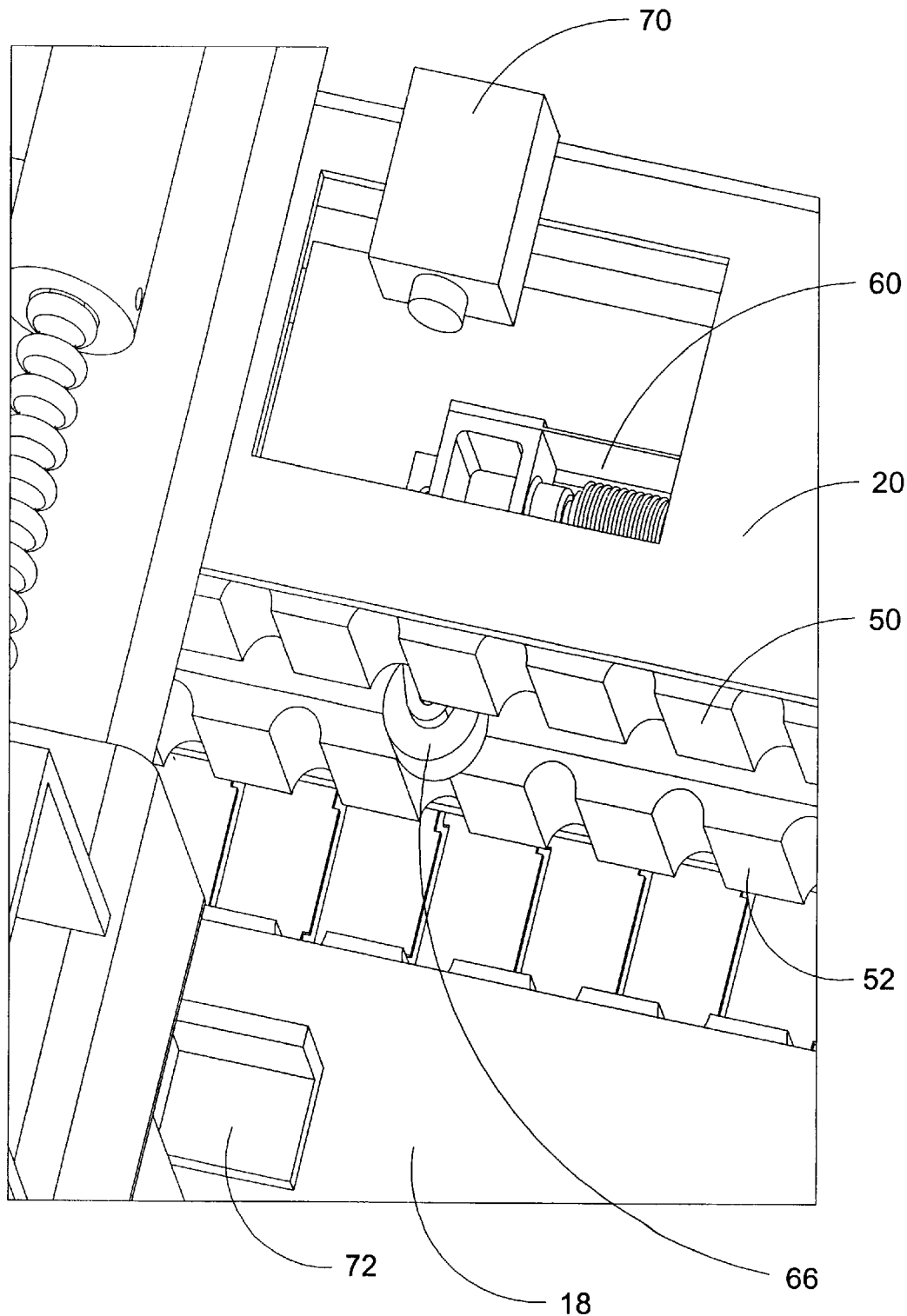
FIG. 8 is a perspective view of an inspection station showing a sensing roller, load cell assembly, and photodetector assembly used to detect the proximity of a container to the testing station.
Figure 11:
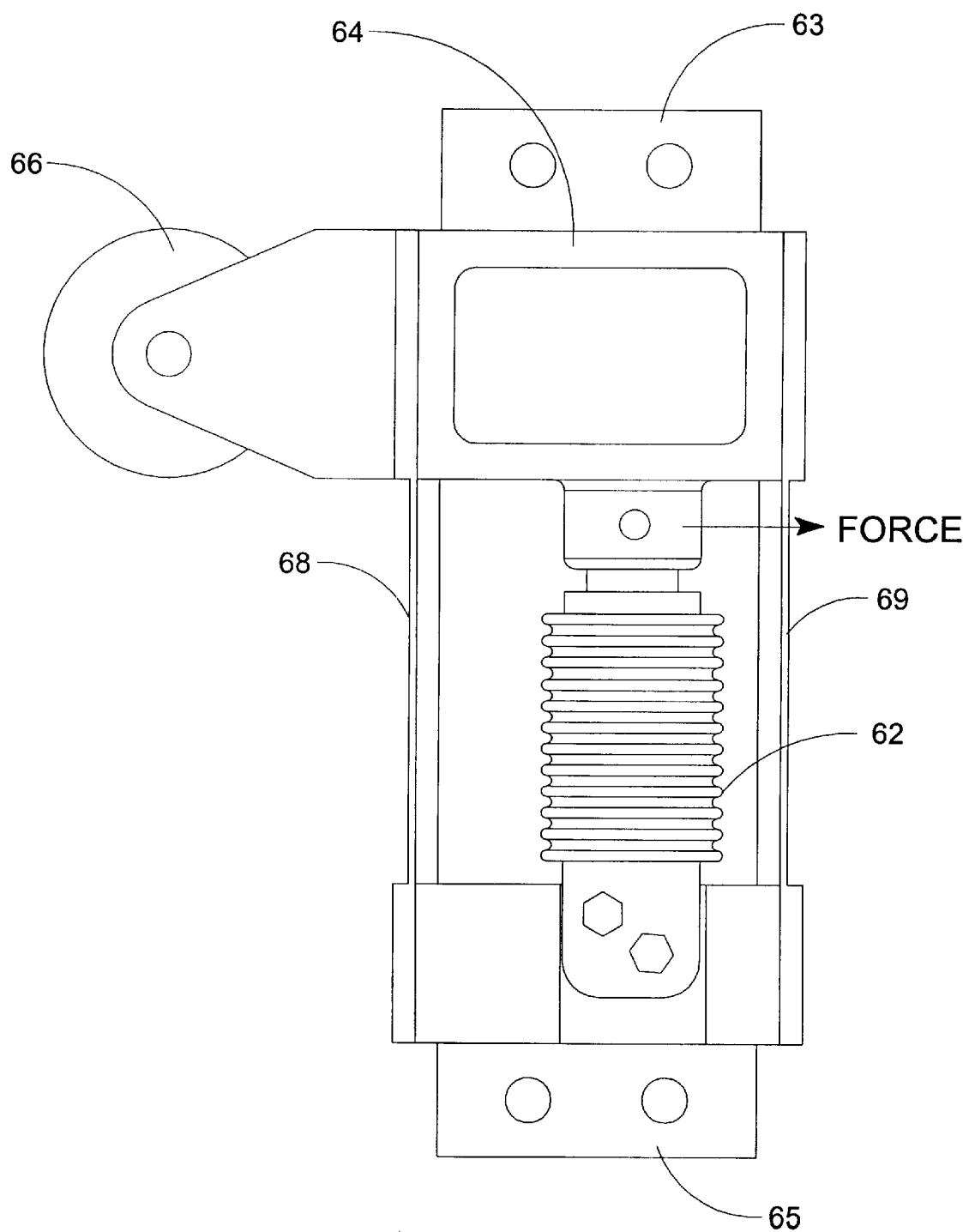
FIG. 11 is a top view of a load cell assembly of the invention showing the contact roller.

There are at least two sensors used in this invention but there may be more. A minimum of two are required to compensate for container-to-container variations in temperature and physical characteristics such as those attributable to geometric, material, and fabrication differences. As shown in FIGS. 4, 8, and 11, each sensor 60 is bolted to compression assembly 20 via a pair of spaced apart flanges 63 and 65 that form part of a support frame. A load cell 62 in the form of a strain gage connected to a bridge circuit is connected in cantilevered fashion to the support frame such that a load perpendicular to the longitudinal axis of the cell 62 (parallel to the direction of production line travel) causes an output response from the bridge circuit. The load cell is connected to a transfer member 64 to which the roller 66 that contacts a container 26 is attached. The transfer member 64 is suspended from the support frame by a pair of spaced apart flexure members 68 and 69. In this manner, the force exerted by a container 26 as it passes by a roller 66 is transferred to the load cell 62 to generate a time varying response carrying information that varies in accordance with the internal pressure of a container over the time interval during which the roller 66 was in contact with the container. It will be appreciated that a roller is not the only method one may use to contact a container, and that other contact arrangements such as skids may be used.

Figure 5:
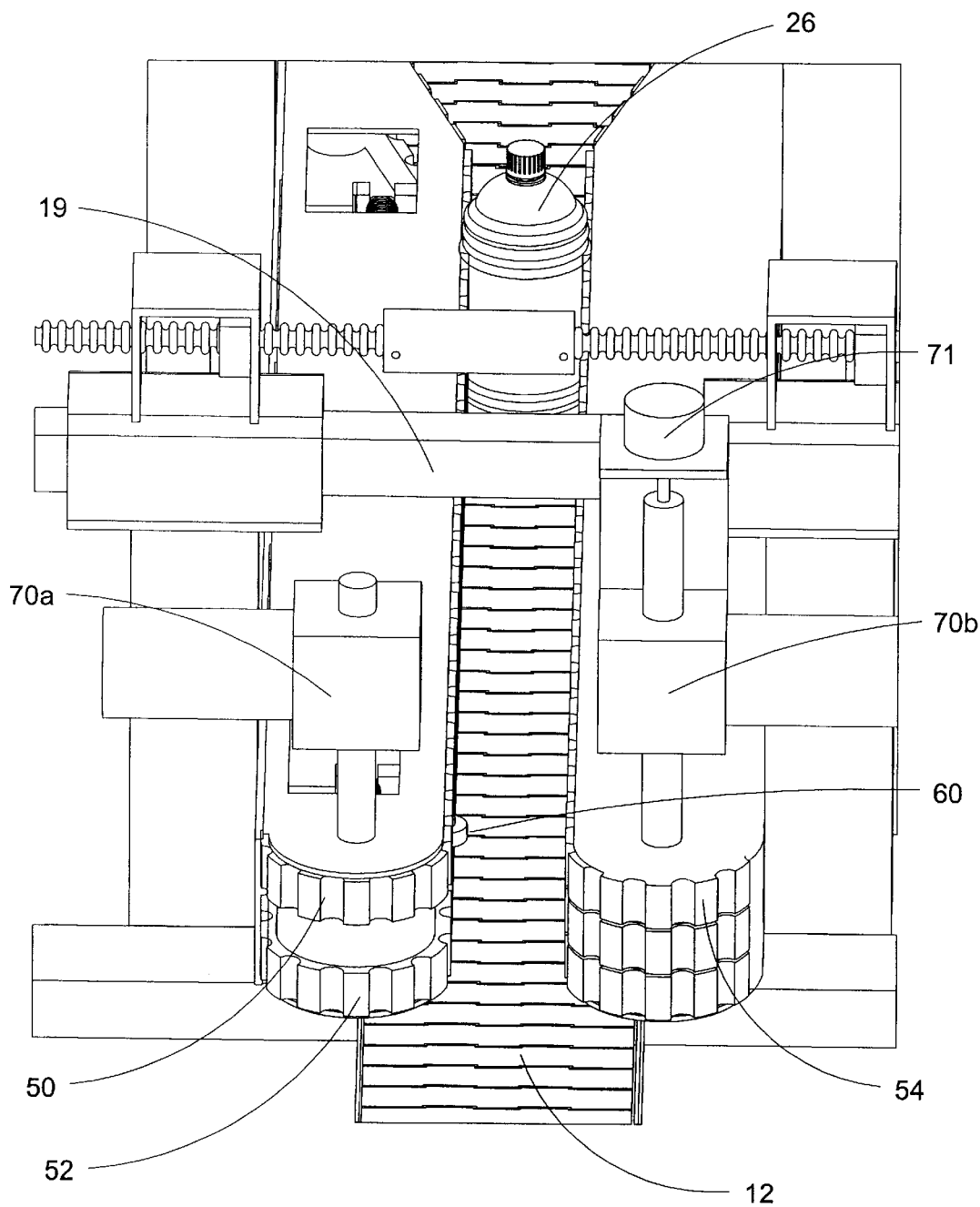
FIG. 5 is a perspective view looking directly upstream at a bottle compressed between the compression belt assembles of the invention as the bottle is transported downstream along the production line, along with motors that drive the sprockets that in turn drive the compression belts associated with each motor.

FIG. 5 shows system 10 from the perspective of a downstream observer looking upstream at a container 26 traveling toward the second sensing station shown at 60. At the upper half of the lower left quadrant of the figure, there is shown a 1 HP AC variable frequency drive motor assembly 70a that is connected to drive sprockets that in turn advance belt sections 50 and 52. In the right quadrant is shown a second variable speed drive motor 70b that is connected to drive sprockets that in turn advance belt section 54. Drive motor 70b, and its associated sprockets, is preferably equipped with a position encoder 71 that synchronizes its motion with that of the production line so that containers proceed smoothly through system 10 without interruption. A conventional Allen Bradley/Rockwell Division variable speed motor controller (e.g., model SP 500) is used to synchronize motor 70a with the speed of motor 70b. A signal for the production line may be used to facilitate keeping track of containers as they enter and exit system 10 and beyond to a reject station positioned a predetermined distance for the exit port of system 10.

Figure 6:
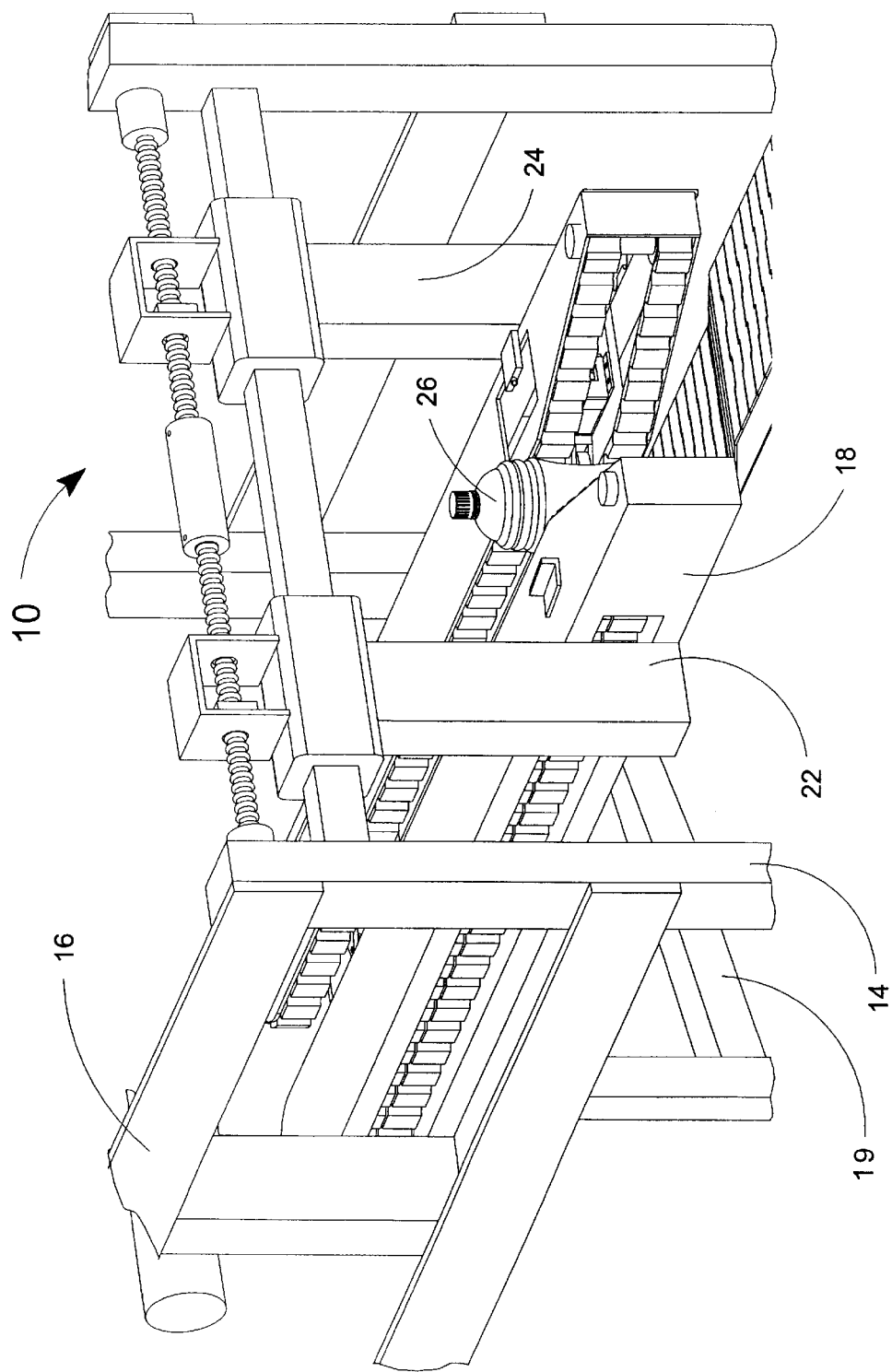
FIG. 6 is a perspective quarter view illustrating downwardly depending vertical arms that support the compression belt assemblies and are adjustable perpendicular to the direction of travel of the belts to set the compression gap between them.
Figure 7:
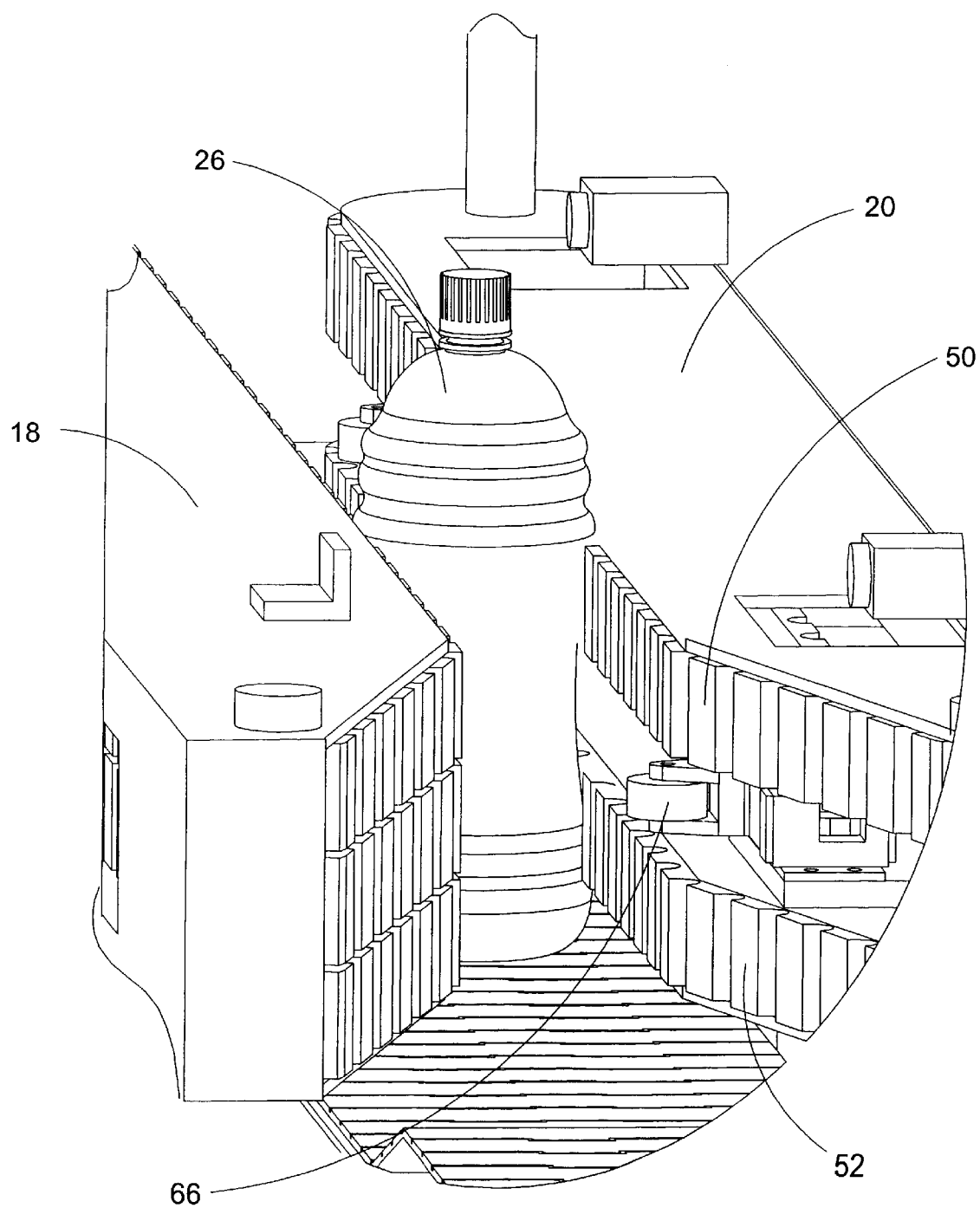
FIG. 7 is a perspective view of a compressed bottle just leaving a sensing station, the roller in the lower right extending between the two belts on the right just having traveled over the bottle to transmit a load to the load cell so that the internal pressure of the container can be determined at a location along the compression belt assemblies.

FIG. 6 shows a three quarter view of system 10 with a container 26 just approaching the first sensing station, and FIG. 7 shows the same container 26 just after it has left the first sensing station; the roller 66 of the first sensing station is shown protruding through belt sections 50 and 52.

Referring now to FIG. 8, there is shown the second sensing station along with a typical photodetection arrangement for detecting when a container 26 is in a predetermined position with respect to a sensor 60. The photodetection arrangement comprises a combination source-photodetector 70 and a retroreflector 72. The source-photodetector 70 projects a beam of light across the path of travel of a container toward retroreflector 72. If a container does not interrupt the projected beam, it is returned by retroreflector 72 to source-photodetector 70 to indicate that no container is located where it should be with respect to a sensor 60. If a container, however, is so located, a signal is generated to indicate that data acquisition should begin. While this scheme is preferable, it is not essential because data acquisition can be triggered off the response of a sensor 60 itself. In addition, it will be appreciated that other beam generation and interruption schemes may be used. For example, a beam may be generated on one side of the compression gap and detected on the opposite side.

Figure 9:
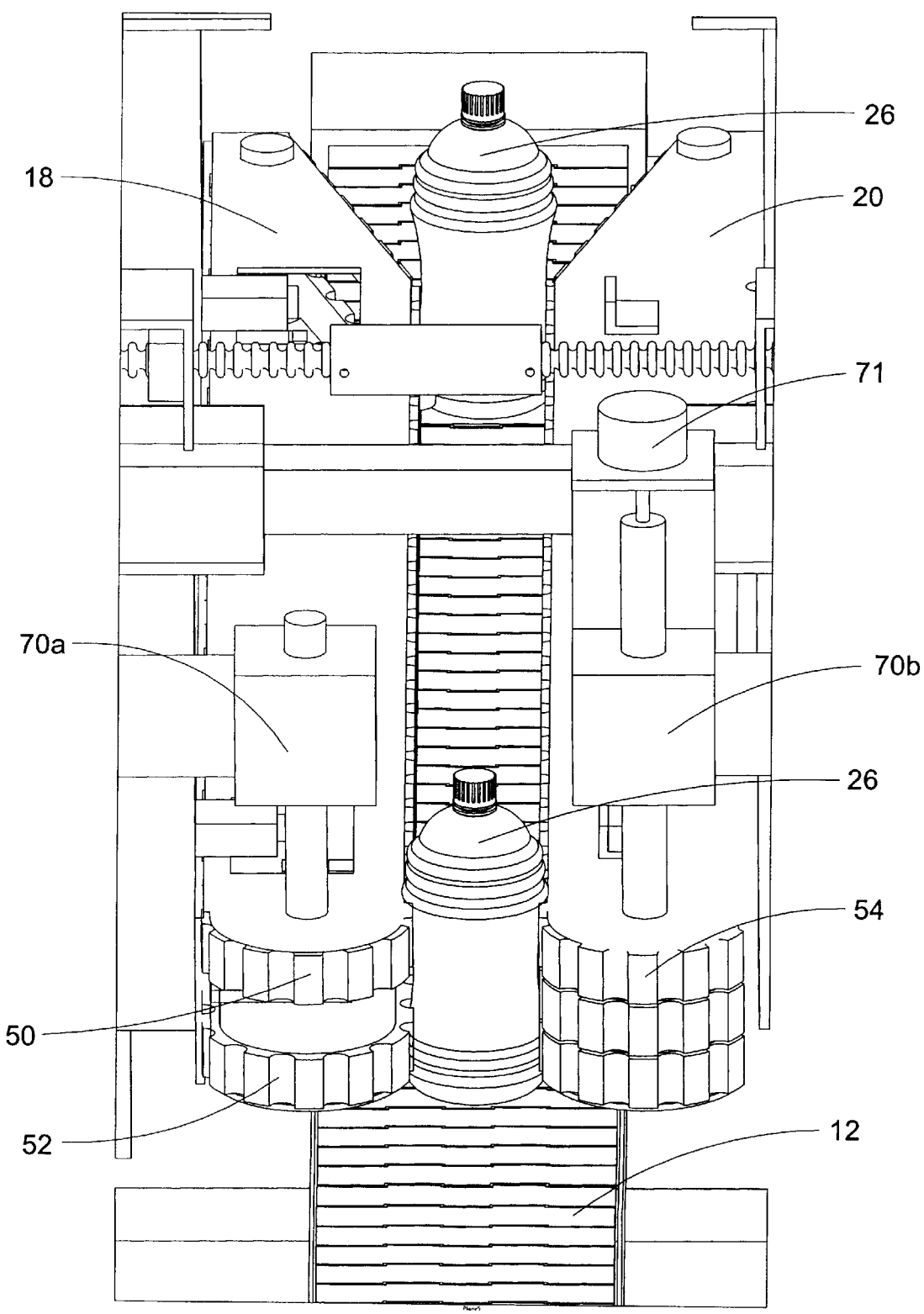
FIG. 9 is a perspective view looking at a container as it is just about to exit the testing apparatus of the invention.

FIG. 9 shows an upstream container 26 just entering system 10 and a downstream container 26 just leaving it. As can be appreciated, the spaced apart sensors 60 are positioned just after the in-feed taper after which the compression is preferably uniform, and the second sensor is position just prior to the release of the compression. However, the invention contemplates that the compression need not necessarily be uniform but advantageously may be made to vary in a predetermined way such as with a step or other profile that would be appropriate for a given container design. It may also be controllably discontinuous or compress and release through a series of cycles as required per each container's characteristics.

Figure 10:
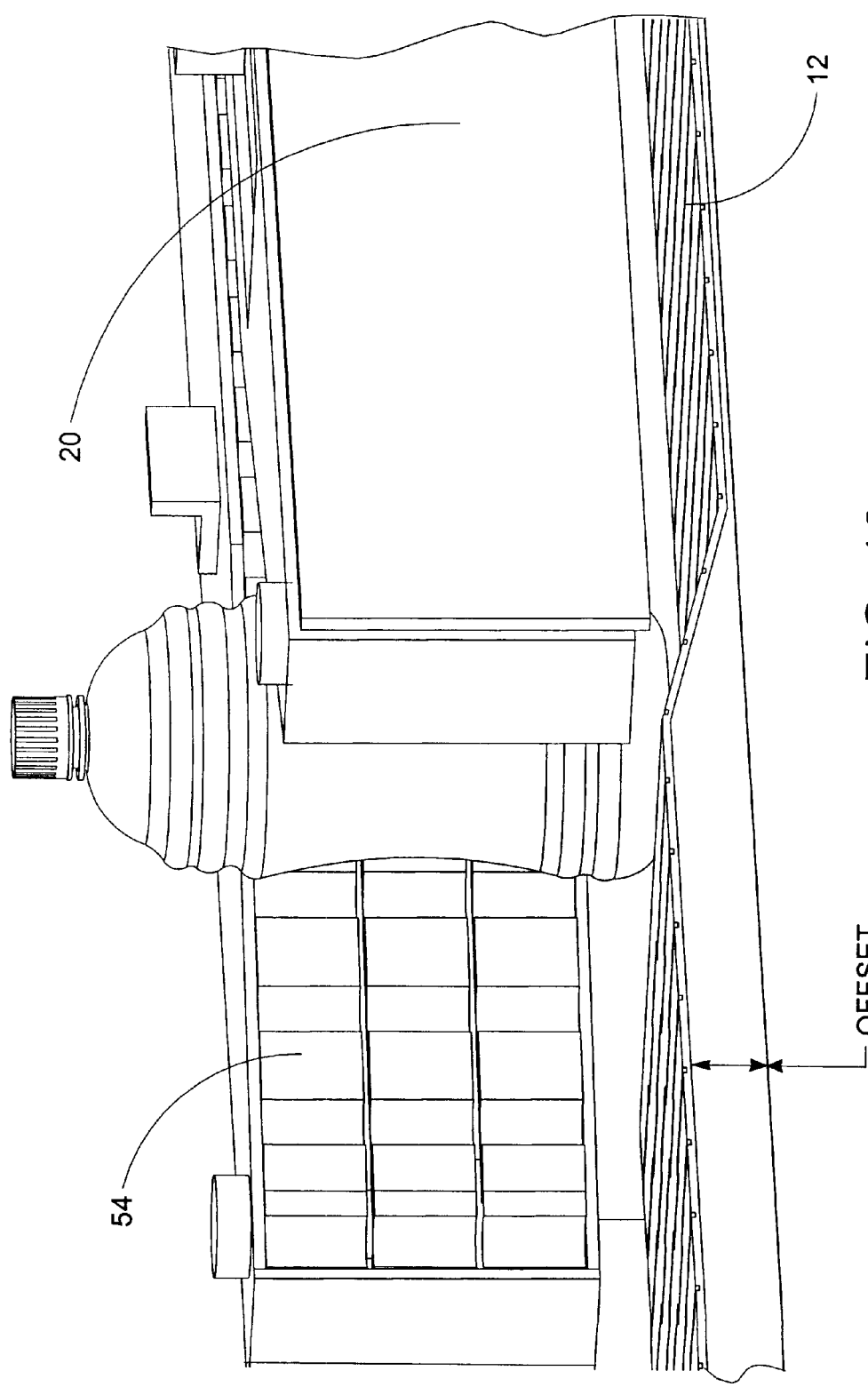
FIG. 10 is a perspective view of the entrance end of the testing apparatus illustrating how the production line conveyor belt is arranged to dip just after the compression is applied to a container so that the bottom of the container is clear of the production belt while the container is being tested.

Reference is now made to FIG. 10 which illustrates a preferred feature of the inventive system 10. Here, it is shown that it is beneficial, especially with large containers that can have appreciable bottom distortion (bulginess) under compression to provide an offset in the production line that provides for a clearance between the bulged portion of the container and the production line so that the production line does not contact the bottom of the container and thereby contribute to the internal container pressure. In effect, this offset permits the compression assemblies 18 and 20 to transport the containers so that they are "lifted" off the production line. A similar offset may be provided at the exit side to "land" the containers back on the production line after they have been tested.

Figure 12:
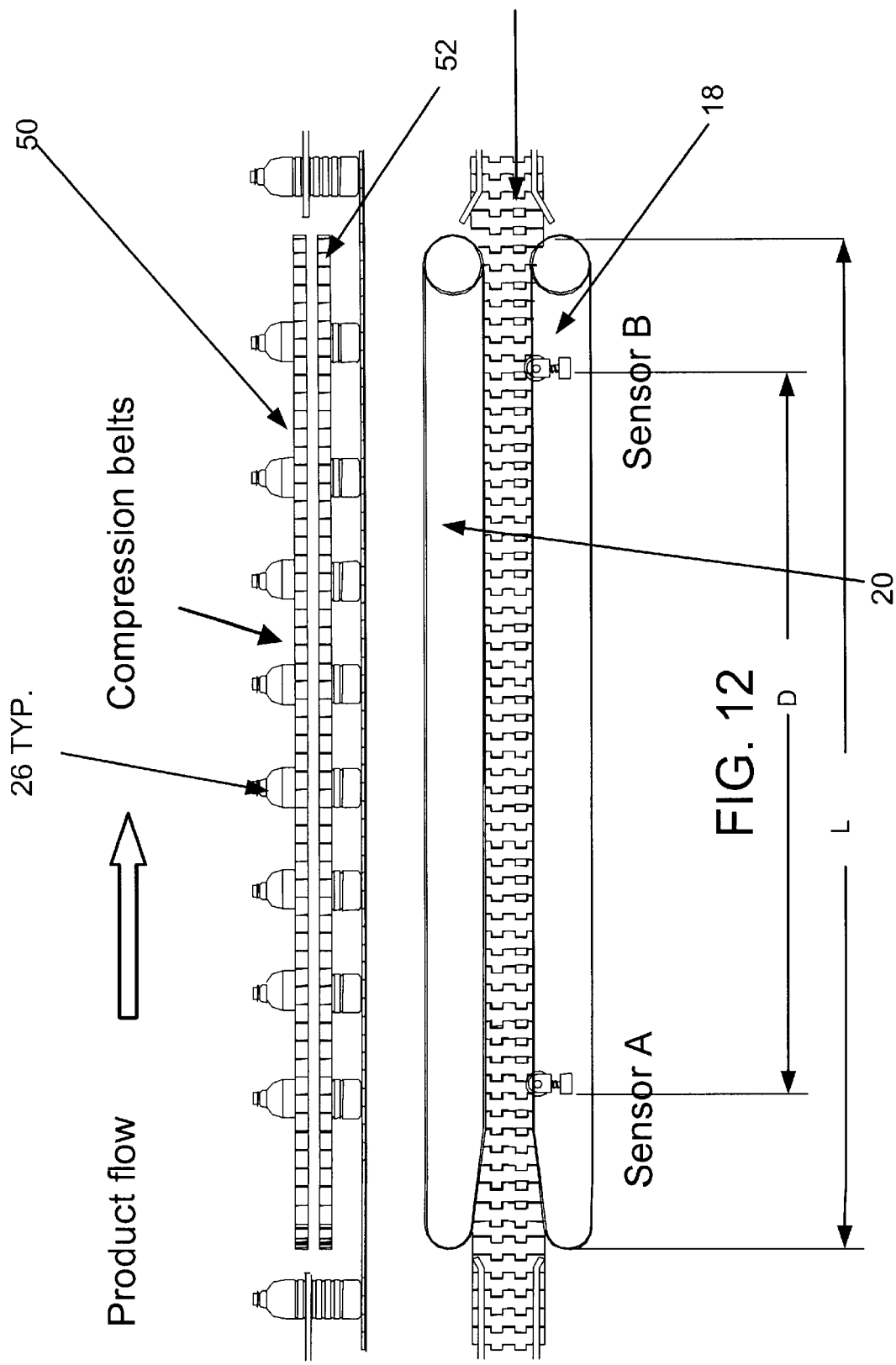
FIG. 12 is a diagrammatic elevational view and a top view of a series of containers traveling through the testing apparatus of the invention showing two sensing stations and various relationships among the sensing stations.
Figure 13:
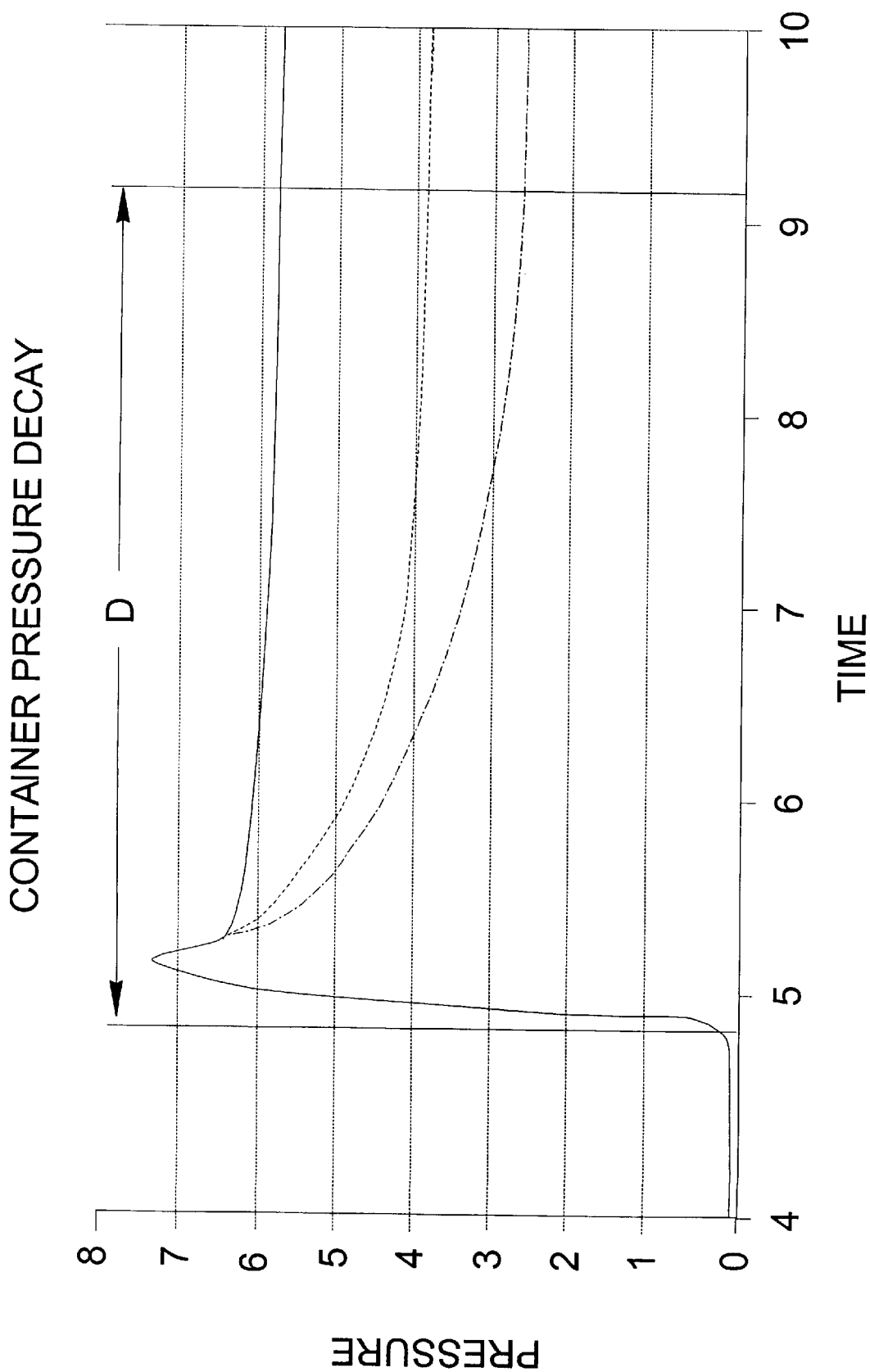
FIG. 13 is a graph showing how the internal pressure of a typical container varies with time after having been compressed sufficiently enough to cause a leak if one were present but not so much that its cap would fail if a leak were not present.

Reference is now made to FIGS. 12 and 13. FIG. 12 shows that compression assemblies 18 and 20 have a predetermined length L and that the first and second sensors are spaced apart by a distance D. FIG. 13 shows the variation is pressure with time for a normal container shown by the solid line, a container with a relatively small sized leak indicated by the dotted line, and a container with a relatively larger leak indicated by the centerline. As indicated by these curves, the second sensor should be spaced from the first sensor by a distance D that is long enough to permit the pressure in a leaky container to reach a stabilized value for the smallest leak that is anticipated. As will be appreciated, the compression gap for a particular container should be set so that the peak pressure induced in a container by the gap is safely below the pressure at which the container cap is anticipated to fail.

In one aspect of the invention, the separation between the compression assemblies at the sensor locations is preferably substantially equal to optimally monitor differences in container internal pressure between the two sensor locations. Also, the supporting structure for the compression assemblies, at least in the region of the sensors, preferably is made sufficiently stiff so that no deflection in the compression assemblies is permitted that would unacceptably contribute to erroneous pressure measurements. What deflection may be tolerable depends on the desired sensitivity of the measurements in a particular case. However, deflections due to insufficient stiffness generally result in apparent lower pressures and sensitivity. How much deflection should be present will depend on the performance desired and the level of precision required. Supporting frames therefore need to be stiffened by robust structure as the need demands, and those skilled in the art may employ well-known design strategies to accomplish this.

Curves similar to those shown in FIG. 13 may be created empirically by placing particular containers with calibrated leaks between a pair of solenoid actuated jaws whose gap can be adjusted. Also, the time it takes for the smallest leak to occur may be estimated and then verified empirically. Since the inspection process is based on the principle of applying an external pressure or forces to the container and causing the headspace pressure to rise to a fixed point, the time it takes for the head space to evacuate can be estimated from well-known formulas governing flow rates and knowing the flow rate and the volume, the time can be estimated and then the distance D can be calculated for a given production line speed.

Figure 14:
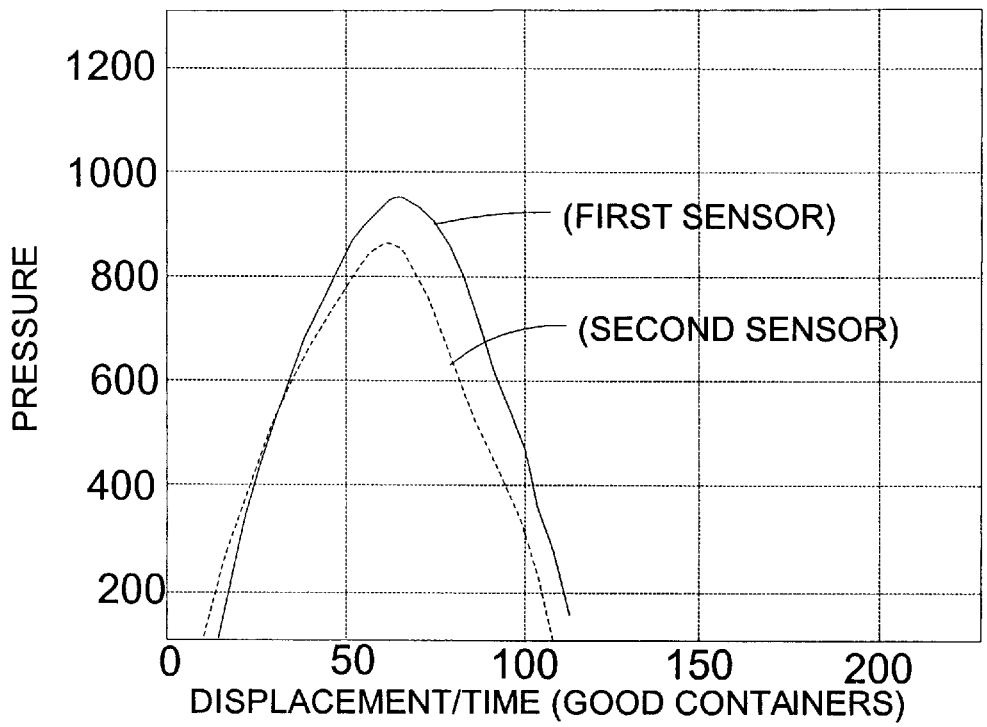
FIG. 14 is a graph showing the response of first and second sensors to containers with no leaks.
Figure 15:
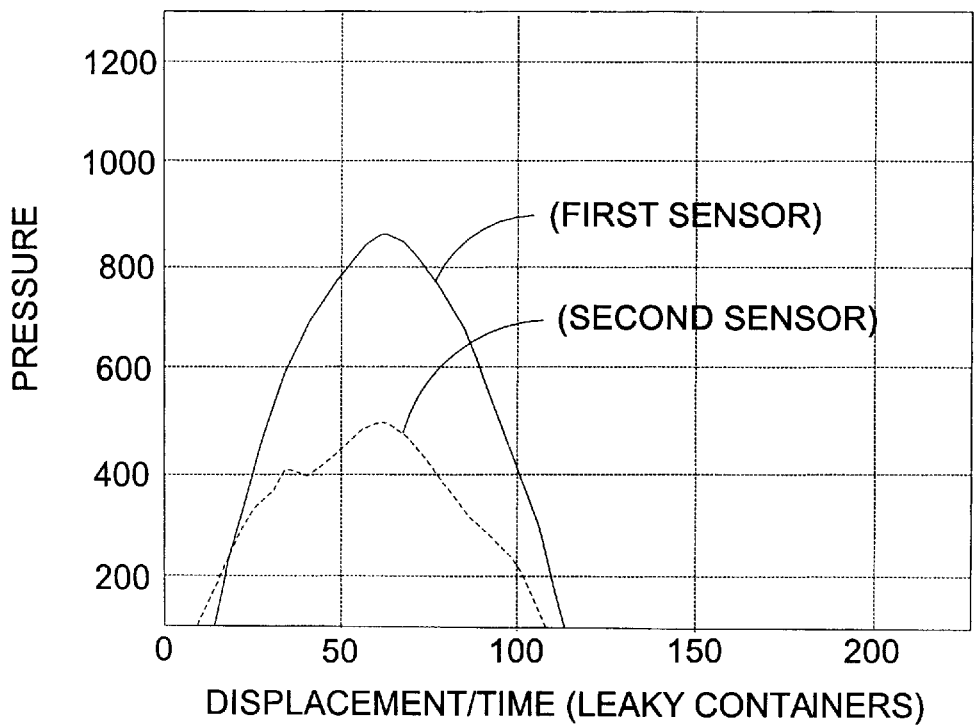
FIG. 15 is a graph showing the response of the first and second sensors to a container with a known leak.
Figure 16:
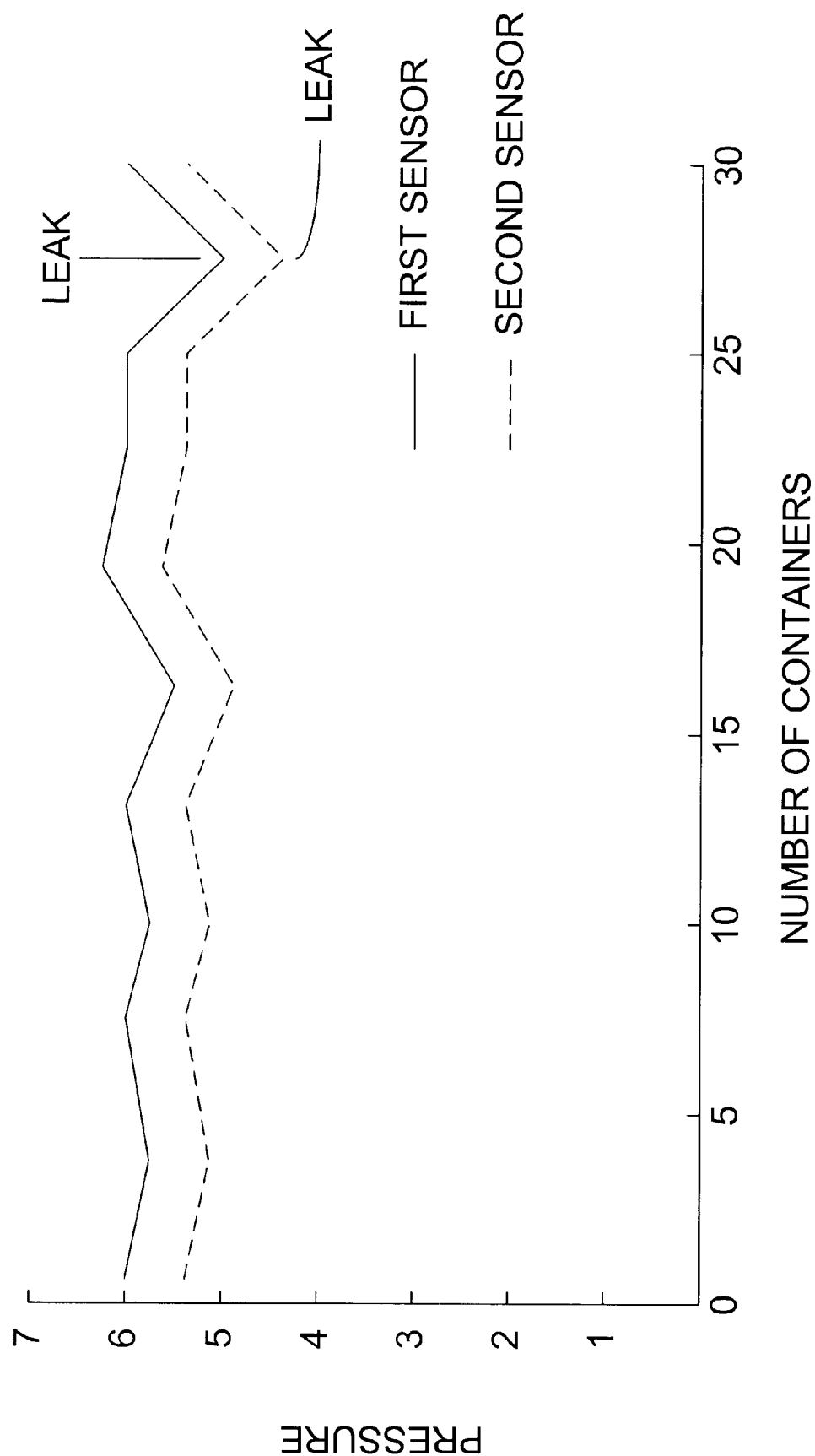
FIG. 16 is a graph showing the response of a pair of sensors spaced from one another along the compression assemblies of the invention.
Figure 17:
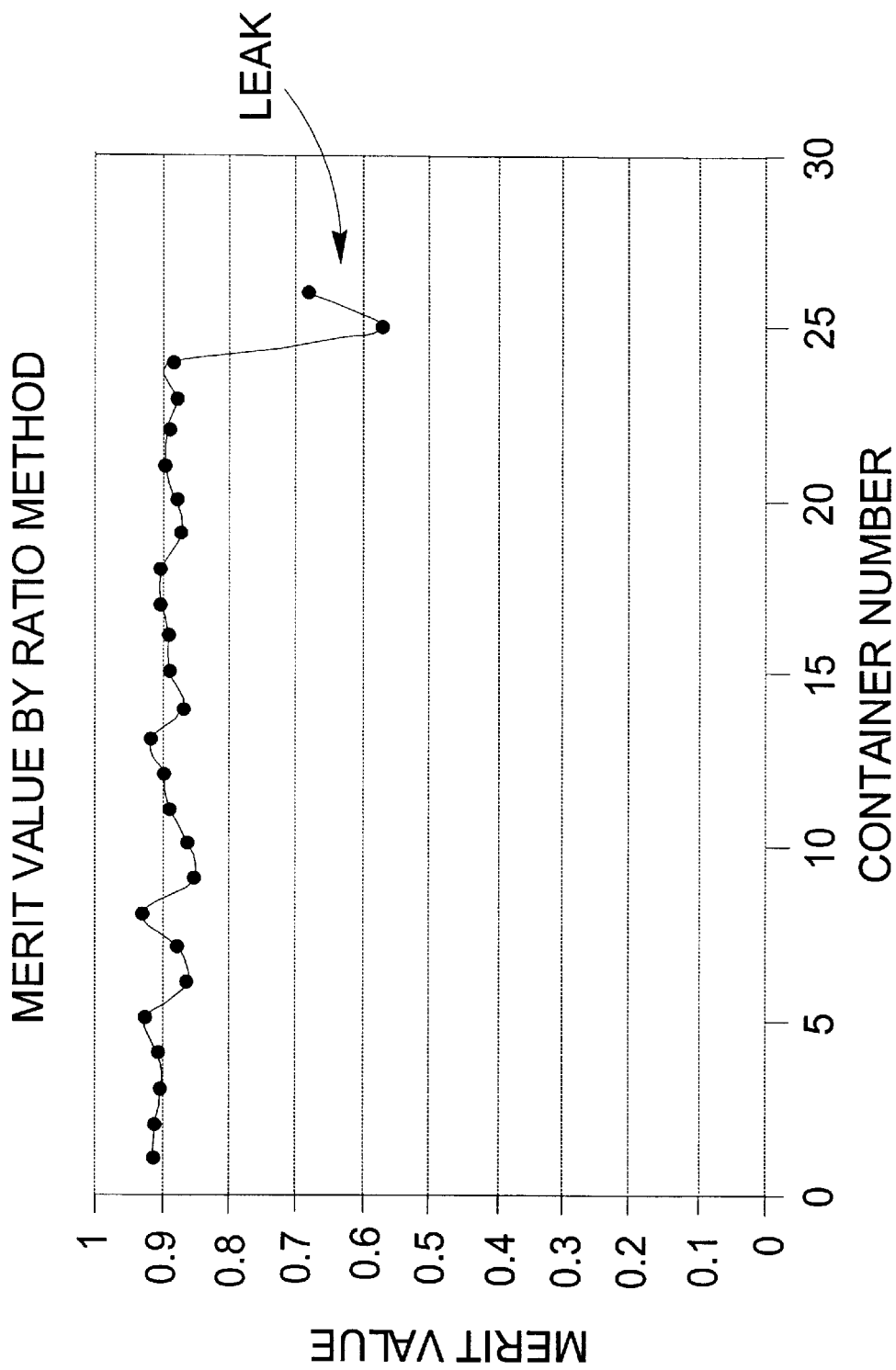
FIG. 17 is a graph showing the ratio of the responses shown in FIG. 16 and indicating the differences in the ratios between containers with and without leaks.

As explained above, once a container has reached a section in the compressive belts after the in-feed taper where the compressive displacement is evenly applied to the container sidewalls, the container is passed over the first sensor within the compressive belts and an initial reading is taken. Then at a fixed distance down stream a second reading is taken. The distance and rate of travel of the passing containers determines the time interval between the readings. FIGS. 14 and 15 show how the response of the first and second sensors differ for a normal versus leaky container. As seen in those figures, the difference in the responses and peak pressures for a normal container do not differ appreciably between the first and second sensor while for a leaky container they do. FIG. 16 shows that these relationships hold not only for individual containers but for larger populations as well. FIG. 16 also indicates that there is a container to container variation among normal and leaky containers. To compensate for this variation, which may be caused by temperature variations or differences in the physical makeup among containers, it is preferred to use a normalization technique to test for leaky containers. One preferred methodology, samples a number of points on each side of a peak response at both sensors. Forty points on each side has been found to be successful but other sampling rates may be used as required. The average of the 80 points is then taken, and the ratio of the averages is then calculated. If the ratio of the second average to the first average is below some figure of merit, say 0.9, a container may be judged as being a leaker.

As previously indicated, data acquisition is preferably begun by triggering off the photodetection system described. However, it will be appreciated from the response curves of FIGS. 14 and 15 that data acquisition may be triggered when the leading edge of the response exceeds some threshold value, say 15 to 20 percent.

Referring back to FIG. 13, it will also be appreciated that data acquisition may also be made to start at different times along the typical time dependent pressure curves for a container. It is clear that it shouldn't start on the sharply increasing slope where the pressure is rising to its maximum value, but can be started on the more slowly decreasing slope following peak pressure or at any combination of that section of the curve and a flatter portion of it or solely in flatter sections where pressure is changing more slowly.

Those in the art will appreciate that other algorithms may be used for figures of merit. For example, predetermined areas under the response curves may be compared, analytical approximations of the response curves may be calculated and coefficients or peaks may be used as the basis for judging for leaks, decay functions may be calculated and decay constants compared, or combinations of these.

In addition, it will be appreciated that maximum and minimum response pressures may be monitored as a adjunct to merit function evaluation to test for overfilled and underfilled containers. Overfilled containers or containers that are entirely filled will appear incompressible and therefore will cause the sensors to spike to levels far above what is anticipated as normal for a nonleaky container, and this type of response is used to reject for overfilled conditions. Contrariwise, low filled containers or empty containers or containers with no caps, will give low pressure readings below those anticipated for even fast leakers, and such responses may be used to reject for a low or no-fill condition.

In addition, it will be appreciated that histories of the responses of the sensors may be monitored to look for drift or degradation in the sensors as manifested by detectable shifts in container population statistics.

Figure 18:
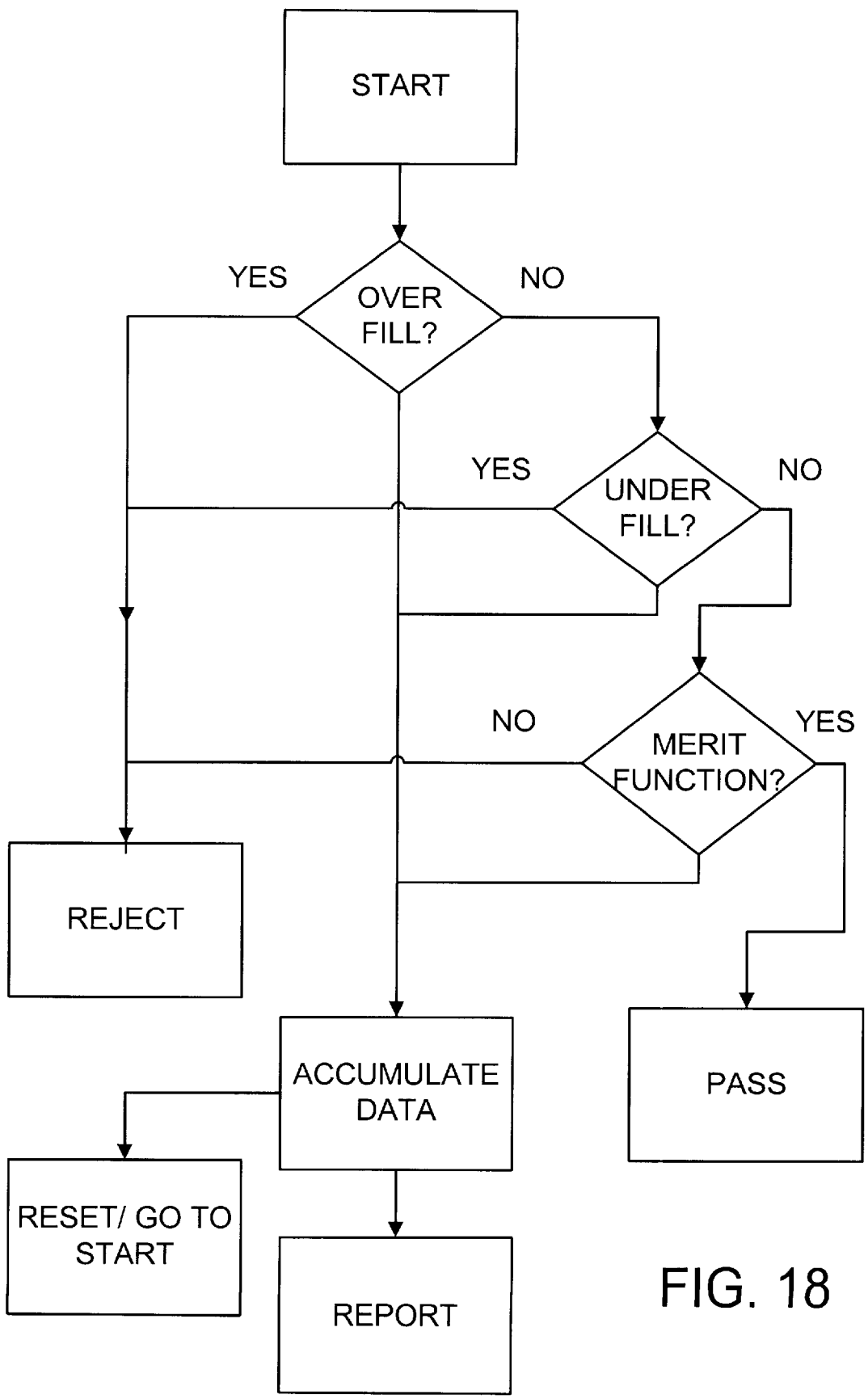
FIG. 18 is a high level flow chart of a method of the invention.

FIG. 18 shows a high level flow chart governing the overall logic for implementing the methodology of the invention via computer software that may be run on a general purpose computer, preferably with a graphical user interface (GUI) or a dedicated processor having a GUI in the form of a touch screen and/or a keyboard input. Due to the high speed nature of the inspection and the need to measure simultaneously at the infeed and outfeed sensors, the preferred computer is a Digital Signal Processor with a real-time processing program.

Figure 19:
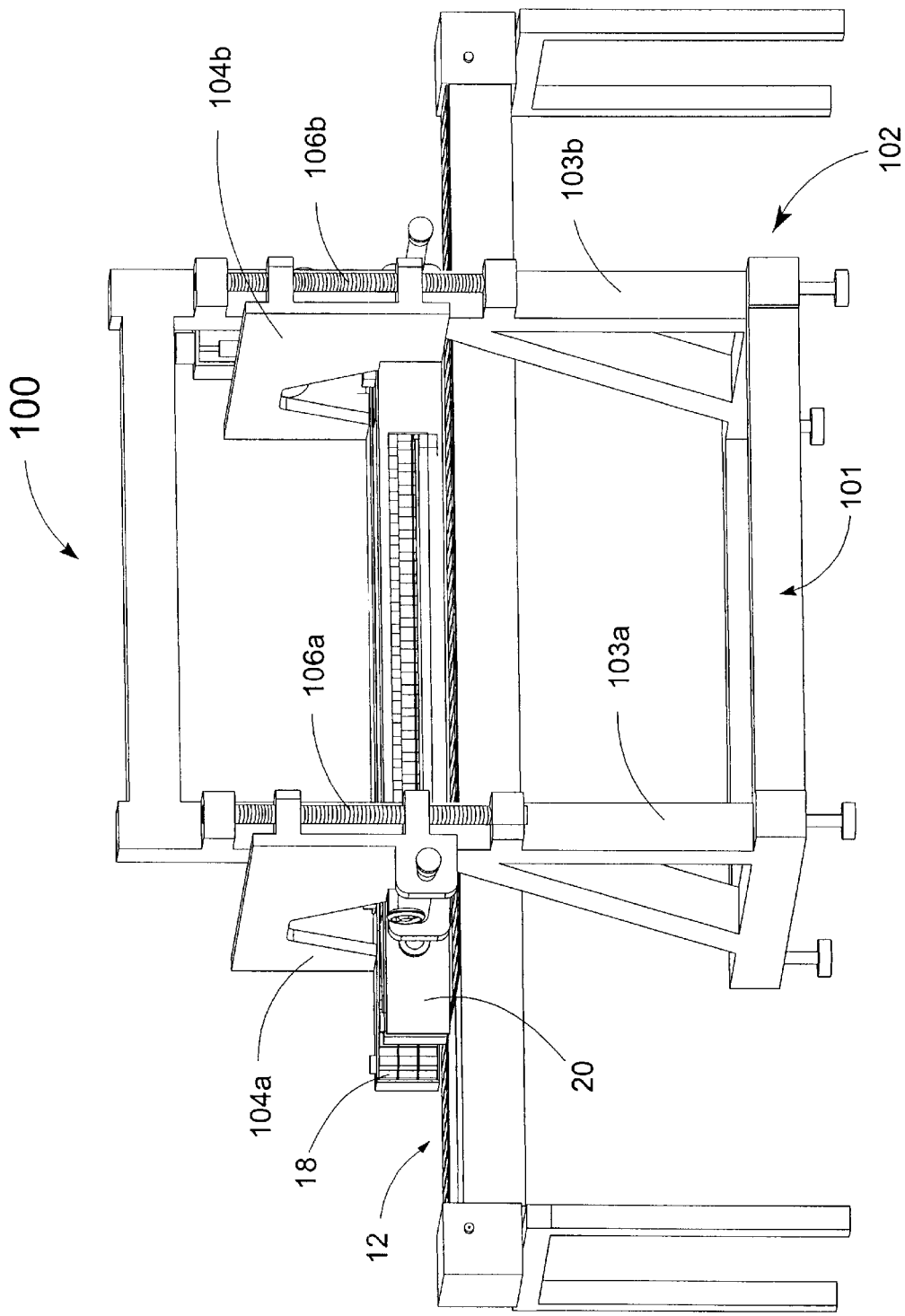
FIG. 19 is a perspective of an alternative apparatus of the invention positioned over a portion of a continuous conveyor for transporting containers along a production line as they undergo various manufacturing and testing operations.
Figure 20:
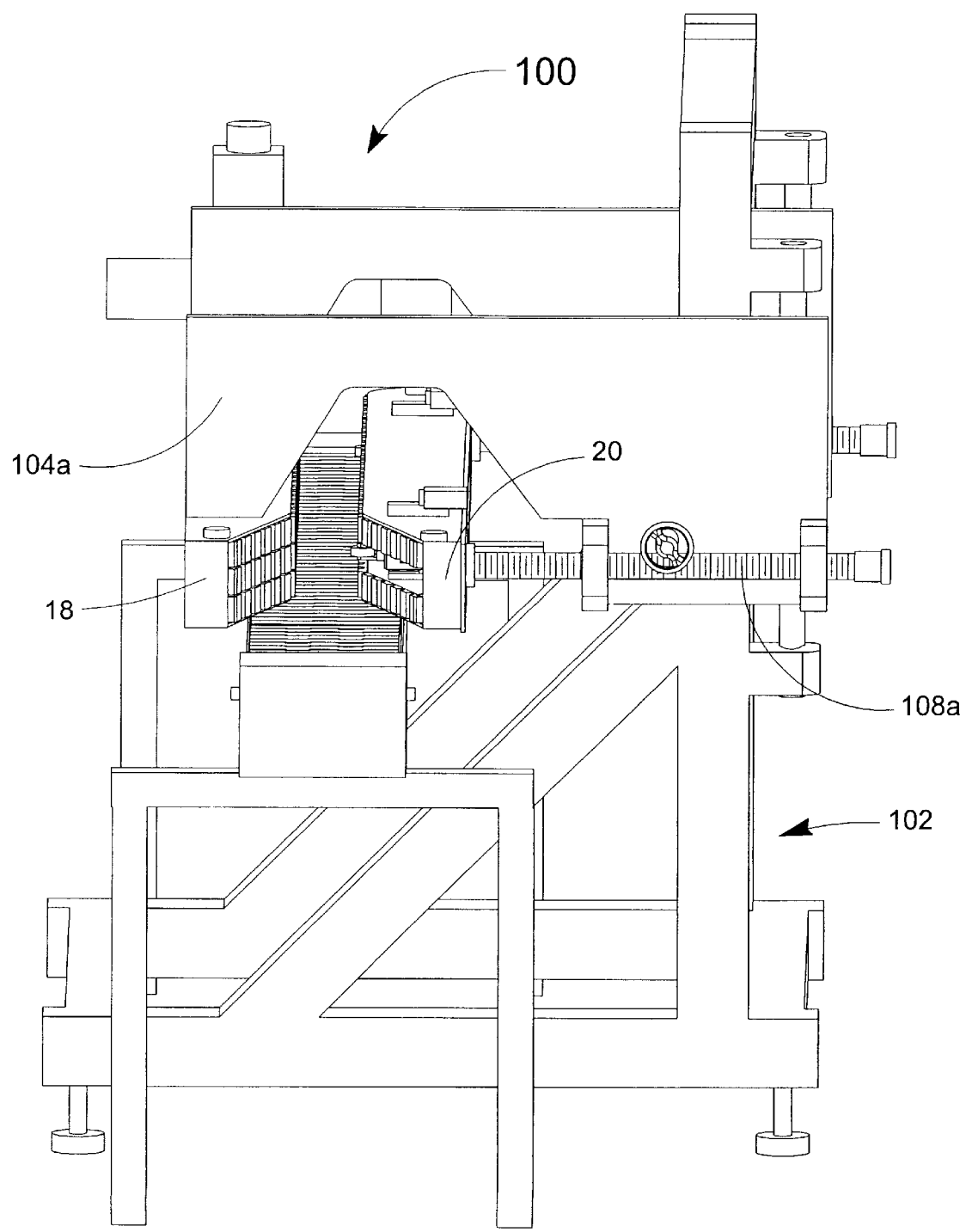
FIG. 20 is a an enlarged perspective view of the container entry end of the alternative apparatus of FIG. 19.

Reference is now made to FIGS. 19 and 20 which show an alternative leak testing apparatus of the invention where it is generally designated as system 100. System 100 is in most respects identical to system 10 but differs from it principally in the manner in which the pair of opposed compression assemblies 18 and 20 are positioned and held in place with respect to the container production line 12. Instead of being supported by a frame that surrounds production line 12 in an inverted U-shaped fashion, compression assemblies 18 and 20 sit just above production line 12 via a double cantilevered arrangement. The major elements of this arrangement comprise a support frame 102 that is designed to be slid under the production line 12 from one of its sides. Support frame 102 comprises a generally rectangular frame 101 having a pair of vertically extending spaced apart columns 103a and 103b that are stiffened by side braces.

Cantilevered from columns 103a and 103b are a corresponding pair of slidably mounted plate assemblies 104a and 104b, respectively. Attached to plate assemblies 104a and 104b are compression assemblies 18 and 20. Here, compression assembly 18 is fixed with respect to plate assemblies 104a and 104b while compression assembly 20 moves in and out with respect to compression assembly 18 through the use of adjustment screws 108a and 108b, respectively, only one of which is shown (See FIG. 20).

The vertical position of compression assemblies 18 and 20 is adjusted via a pair of jack screws 106a and 106b that move the plate assemblies with respect to columns 103a and 103b. In other respects, system 100 is substantially identical to system 10.

While the invention has been described with particular embodiments, it will be apparent to those skilled in the art that it may be implemented in other ways based on the principles disclosed. For example, although the belt architecture currently has a vertical geometry that is parallel to the vertical geometry of the container, the geometry can be adapted to the container geometry for optimal results, e.g. a convex belt profile. Or the invention may be applied to sealed bags such as potato chips by rotating the apparatus 90 degrees so that one belt is above the other. Also, measurement of each container is recorded from each sensor output, and the sensor assembly provides a continuous signal output to the controller assembly when a photobeam interrupt is caused by the passing container. The inspection system controller can be arranged to compare the resultant values to that of a known good profile (or sampled portion of profile or their average values over more sampling intervals). If the profile falls outside of an acceptable range, the controller can send a reject signal to discharge the faulty container from the production line. In addition, the sensor assembly is designed to be fit between the two parallel compressive belts on one side of the compression . The sensor can be behind the belt rather than protruding through a split belt. It should also be noted that, in practice, it may not be necessary to use two sensors to measure each container if container manufacturing techniques can consistently and reliably produce containers with minimal differences in those properties that would otherwise cause variations in pressure measurements among containers that were identically filled and sealed. Under these special conditions, a single sensor may be used to measure containers, preferably after they had been compressed for some predetermined distance of travel.

One potential problem with the embodiments of the invention shown in the drawings is that they are not provided with any mechanism for monitoring the performance of the sensors. Accordingly, should the performance of one sensor differ from normal, either because of routine wear or because of some malfunction in the sensor, the apparatus may fail to detect leaky containers and/or may erroneously indicate some acceptable containers as leakage, and for obvious reasons either type of error may have serious consequences. To avoid such problems, it may be desirable to equip the present apparatus with two or more pairs of sensors, with each pair functioning in the same manner as the pair of sensors in the embodiments previously described, with each container passing all of the sensors and with the receiving and analyzing means being arranged to analyze the readings from the same container from each pair of sensors independently and to generate an output signal if the results of the analysis from different pairs of sensors differ by more than a predetermined amount. This output signal could be used to reject containers in which the readings from the two pairs of sensors differ by more than a predetermined amount, such as 5%. However, such an output (alarm) signal might be used, in ways which will be apparent to those skilled in production line technology, to shut down the production line automatically or to generate an alarm signal, such as a light or audible signal, to alert production workers to the malfunction. Such a multi-sensor apparatus might use a single in-line means which accommodates all the multiple pairs of sensors, but desirably will use multiple separate in-line means, one for each pair of sensors, thus allowing monitoring for any malfunction in the in-line means as well as in the sensors.

In summary, an improved sensitivity has been demonstrated by measuring near the infeed with a force transfer pressure sensor (FTPS), followed by a period of somewhat constant compression distance (CD), then followed by a second FTPS. What is advantageous to the system, however, is its ability to measure the entire FTPS wave shape and make correlations with accumulated leak experience by using advanced digital signal processing hardware and software at high speed for a multitude of containers at various stages of progress through the measuring machine. By using a differential ratio method compensation can be achieved for variations in container size, elasticity, temperature, and headspace because each container is compared with its own FTP at infeed to determine the difference produced in response to the time under compressive displacement. Due to the conditions of confinement of the container at the infeed and outfeed FTPS seldom will containers be identical due to mechanical imperfection. Therefore, the actual force travel profile, FTP, can be rationalized against the statistical norm of all containers passing, and the rationalized container outfeed FTP can be subtracted from the rationalized infeed FTP.

Other embodiments of the invention will occur to those skilled in the art and are intended to fall within the scope of the invention as set forth in the claims.

What is claimed is:

1. An apparatus for testing flexible containers, said apparatus comprising:
   in-line means for applying a predetermined compression over a predetermined time to a plurality of containers as they travel along a production line;
   at least two sensors spaced apart with respect to one another at predetermined positions along the path of travel taken by the containers while said containers have said predetermined compression applied by said in-line means, each of said at least two sensors being arranged to generate a response that varies in accordance with the internal pressure of said containers as they pass by said sensor; and
   means for receiving said responses and analyzing them for the presence of leaks in said containers.

2. An apparatus according to claim 1 wherein said in-line means comprises two substantially parallel movable members spaced apart from one another and arranged to hold said plurality of containers therebetween, and to move said plurality of containers along said production line without interrupting their flow while applying said predetermined compression to said plurality of containers.

3. An apparatus according to claim 2 further comprising adjustment means for adjusting the spacing between said movable members to allow the apparatus to operate on containers of differing sizes.

4. An apparatus according to claim 2 wherein said movable members have the form of endless belts.

5. An apparatus according to claim 2 wherein the surfaces of said movable members which contact said plurality of containers are textured and non-planar.

6. An apparatus according to claim 1 further comprising a support surface for said plurality of containers, said support surface having a first section spaced from said in-line means and a second section disposed adjacent said in-line means, said second section being lower than said first section, whereby said plurality of containers rest in contact with said first section as they approach said in-line means, but said plurality of containers are held by said in-line means out of contact with said second section of said support surface.

7. An apparatus according to claim 1 wherein at least one of said sensors comprises a contact member and a deformable member, said contact member being arranged to contact each of said plurality of containers as each container undergoes said predetermined compression by said in-line means, and said deformable member having one end connected to said contact member and its opposed end connected to a fixed member, said deformable member being provided with signal generating means arranged to generate a signal representative of the deformation of said deformable member caused by contact between said contact member and each of said plurality of containers.

8. An apparatus according to claim 7 wherein said contact member has the form of a freely rotatable roller which can roll over the surface of each of said plurality of containers.

9. An apparatus according to claim 7 wherein said in-line means comprises two substantially parallel, spaced compression members arranged to apply said predetermined compression to each of said plurality of containers, and wherein said contact member extends between said compression members to contact said containers.

10. An apparatus according to claim 7 wherein said deformable member comprises a strain gauge.

11. An apparatus according to claim 1 further comprising container detection means for detecting when one of said plurality of containers is in a predetermined position with respect to one of said sensors.

12. An apparatus according to claim 11 wherein said container detection means comprises a light source arranged to generate light and direct a beam of light towards said one container, and light detection means arranged to detect when said beam is interrupted by, or reflected from, said one container.

13. An apparatus according to claim 1 wherein the spacing between said at least two sensors is long enough to permit the pressure in a leaky container to reach a stabilized value for the smallest leak that is anticipated.

14. An apparatus according to claim 1 wherein said receiving and analyzing means is arranged to detect, in the response from each of said at least two sensors, the peak pressure generated within each container caused by said predetermined compression and to measure the pressure within said container at a number of points on each side of the peak pressure.

15. An apparatus for testing flexible containers, said apparatus comprising:
   in-line means for applying a predetermined compression over a predetermined time to a plurality of containers as they travel along a production line;
   at least two sensors spaced apart with respect to one another at predetermined positions along the path of travel taken by the compressed containers to generate responses that vary in accordance with the internal pressure of said containers as they pass by said sensors; and
   means for receiving said responses and analyzing them for the presence of leaks in said containers,
   said receiving and analyzing means being arranged to detect, in the response from each of said at least two sensors, the peak pressure generated within each container caused by said predetermined compression and to measure the pressure within said container at a number of points on each side of the peak pressure, and to average the pressure at said number of points, to determine the ratio between the average pressure measured by at least two sensors, and to generate an output signal if said ratio lies outside a predetermined range.

16. An apparatus for testing flexible containers, said apparatus comprising:
   in-line means for applying a predetermined compression over a predetermined time to a plurality of containers as they travel along a production line;

at least two sensors spaced apart with respect to one another at predetermined positions along the path of travel taken by the compressed containers to generate responses that vary in accordance with the internal pressure of said containers as they pass by said sensors; and means for receiving said responses and analyzing them for the presence of leaks in said containers, said receiving and analyzing means being arranged to detect, in the response from each of said at least two sensors, the peak pressure generated within each container caused by said predetermined compression and to measure the pressure within said container at a number of points on each side of the peak pressure, and to generate an output signal if said peak pressure generated within each container lies outside a predetermined range.

17. An apparatus for testing flexible containers, said apparatus comprising:

in-line means for applying a predetermined compression over a predetermined time to a plurality of containers as they travel along a production line;

at least two sensors spaced apart with respect to one another at predetermined positions along the path of travel taken by the compressed containers to generate responses that vary in accordance with the internal pressure of said containers as they pass by said sensors; and means for receiving said responses and analyzing them for the presence of leaks in said containers, said apparatus having the form of a mobile unit capable of being added to an existing production line, and having a support means capable of supporting said in-line means and said at least two sensors separately from said production line.

18. An apparatus for testing flexible containers, said apparatus comprising:

in-line means for applying a predetermined compression over a predetermined time to a plurality of containers as they travel along a production line;

at least two pairs of sensors spaced apart with respect to one another at predetermined positions along the path of travel taken by the compressed containers and arranged so that each of said plurality of containers passes all of said two pairs of sensors, said two pairs of sensors being arranged to generate responses that vary in accordance with the internal pressure of said containers as they pass by said sensors; and means for receiving said responses and analyzing them for the presence of leaks in said containers, said receiving and analyzing means being arranged to analyze the readings from each pair of sensors independently and to generate an output signal if the results of said analysis from two different pairs of sensors differ by more than a predetermined amount.

19. An apparatus according to claim 1 having at least two separate in-line means, one of said in-line means effecting compression of each of said plurality of containers as each container passes one of said pairs of sensors, and another of said in-line means effecting compression of each of said plurality of containers as each container passes another of said pairs of sensors.

20. A method for testing flexible containers as they travel along a production line, said method comprising:

applying a predetermined compression to said plurality of containers as they travel along said production line;

while said predetermined compression is applied to each container, contacting said container with each of at least two sensors spaced apart from one another to generate responses that vary in accordance with the internal pressure of the container at it passes by said sensors, any given container contacting said at least two sensors at different times; and analyzing said responses for the presence of leaks in the containers.

21. A method according to claim 20 wherein said predetermined compression is applied by two substantially parallel movable members spaced apart from one another and arranged to hold said plurality of containers therebetween, and to move said plurality of containers along said production line without interrupting their flow while applying said predetermined compression.

22. A method according to claim 21 wherein the spacing between said movable members is adjustable to allow the apparatus to operate on containers of differing sizes.

23. A method according to claim 21 wherein said movable members have the form of endless belts.

24. A method according to claim 21 wherein the surfaces of said movable members which contact said plurality of containers are textured and non-planar.

25. A method for testing flexible containers as they travel along a production line without interrupting the flow of containers along the production line, said method comprising:

applying a predetermined compression to said plurality of containers as they travel along said production line;

while said predetermined compression is applied to each container, contacting said container with each of at least two sensors spaced apart from one another to generate responses that vary in accordance with the internal pressure of the container at it passes by said sensors, any given container contacting said at least two sensors at different times; and analyzing said responses for the presence of leaks in the containers, said method further comprising moving said plurality of containers in contact with a support surface prior to applying said predetermined compression to said plurality of containers, but holding said plurality of containers out of contact with said support surface as said predetermined compression is applied.

26. A method according to claim 20 wherein at least one of said sensors comprises a contact member and a deformable member, said contact member being arranged to contact each of said plurality of containers as each container undergoes said predetermined compression by said in-line means, and said deformable member having one end connected to said contact member and its opposed end connected to a fixed member, said deformable member being arranged to generate a signal representative of the deformation of said deformable member caused by contact between said contact member and each of said plurality of containers.

27. A method according to claim 26 wherein said contact member has the form of a freely rotatable roller which rolls over the surface of each of said plurality of containers.

28. A method according to claim 26 wherein said predetermined compression is applied to each of said plurality of containers by two substantially parallel, spaced compression members, and wherein said contact member extends between said compression members to contact said containers.

29. A method according to claim 26 wherein said deformable member comprises a strain gauge.

30. A method according to claim 20 further comprising detecting when one of said plurality of containers is in a predetermined position with respect to one of said sensors.

31. A method according to claim 30 wherein said detection of said container is effected by direct a beam of light towards said container, and detecting when said beam is interrupted by, or reflected from, said container.

32. A method for testing flexible containers as they travel along a production line without interrupting the flow of containers along the production line, said method comprising:

applying a predetermined compression to said plurality of containers as they travel along said production line;

while said predetermined compression is applied to each container, contacting said container with each of at least two sensors spaced apart from one another to generate responses that vary in accordance with the internal pressure of the container at it passes by said sensors, any given container contacting said at least two sensors at different times; and analyzing said responses for the presence of leaks in the containers, the spacing between said at least two sensors being long enough to permit the pressure in a leaky container to reach a stabilized value for the smallest leak that is anticipated.

33. A method for testing flexible containers as they travel along a production line without interrupting the flow of containers along the production line, said method comprising:

applying a predetermined compression to said plurality of containers as they travel along said production line;

while said predetermined compression is applied to each container, contacting said container with each of at least two sensors spaced apart from one another to generate responses that vary in accordance with the internal pressure of the container at it passes by said sensors, any given container contacting said at least two sensors at different times; and analyzing said responses for the presence of leaks in the containers by detecting, in the response from each of said at least two sensors, the peak pressure generated within each container caused by said predetermined compression, and measuring the pressure within said container at a number of points on each side of the peak pressure.

34. A method according to claim 33 further comprising averaging the pressure at said number of points, determining the ratio between the average pressure measured by at least two sensors, and generating an output signal if said ratio lies outside a predetermined range.

35. A method according to claim 33 further comprising generating an output signal if said peak pressure generated within each container lies outside a predetermined range.

36. A method for testing flexible containers as they travel along a production line without interrupting the flow of containers along the production line, said method comprising:

applying a predetermined compression to said plurality of containers as they travel along said production line;

while said predetermined compression is applied to each container, contacting said container with each of at least two pairs of sensors spaced apart from one another to generate responses that vary in accordance with the internal pressure of the container at it passes by said sensors, any given container contacting said at least two pairs of sensors at different times; and analyzing said responses for the presence of leaks in the containers by analyzing the readings from each pair of sensors independently, and generating an output signal if the results of said analysis from two different pairs of sensors differ by more than a predetermined amount.

37. A method according to claim 36 wherein said predetermined compression is applied to each of said plurality of containers by a first compression means as each container passes one of said pairs of sensors, and by a second compression means separate from said first compression means as each of said plurality of containers passes another of said pairs of sensors.

* * * * *